US009661211B2

(12) United States Patent
Matsui et al.

(10) Patent No.: US 9,661,211 B2
(45) Date of Patent: May 23, 2017

(54) IMAGE CAPTURE APPARATUS AND METHOD FOR CONTROLLING THE SAME

(71) Applicant: CANON KABUSHIKI KAISHA, Tokyo (JP)

(72) Inventors: Shun Matsui, Tokyo (JP); Jun Makino, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 19 days.

(21) Appl. No.: 14/707,445

(22) Filed: May 8, 2015

(65) Prior Publication Data
US 2015/0334297 A1    Nov. 19, 2015

(30) Foreign Application Priority Data

May 13, 2014  (JP) .................................. 2014-099828
Feb. 25, 2015  (JP) .................................. 2015-035630

(51) Int. Cl.
*H04N 5/232*    (2006.01)

(52) U.S. Cl.
CPC ..... *H04N 5/23212* (2013.01); *H04N 5/23232* (2013.01)

(58) Field of Classification Search
CPC .. H04N 5/23212; H04N 5/23232; H04N 9/07; H04N 5/378; H04N 9/68; H04N 9/64; H04N 9/045; H04N 5/3696; H04N 5/217; H04N 5/2353; H04N 5/37455; H04N 5/374; H04N 5/23; H04N 13/026; H04N 13/0225; H04N 13/0296; H04N 13/0217; H04N 2013/0096; G06T 5/50; G06T 2207/10024; G06T 2207/20224; H01L 27/14641; H01L 27/14609; H01L 27/14627;

(Continued)

(56) References Cited

U.S. PATENT DOCUMENTS

2012/0268613 A1* 10/2012 Nishio .................. G02B 7/346
                                                  348/208.5
2013/0029555 A1*  1/2013 Morimoto ............ A61F 13/511
                                                  442/364

(Continued)

FOREIGN PATENT DOCUMENTS

JP    2008-015754 A    1/2008
JP    2009-124313 A    6/2009
JP    2013-211833 A    10/2013

OTHER PUBLICATIONS

The above foreign patent document was cited in the Mar. 2, 2017 Korean Office Action, that issued in Korean Patent Application No. 10-2015-0066381.

*Primary Examiner* — Roberto Velez
*Assistant Examiner* — Tuan Le
(74) *Attorney, Agent, or Firm* — Cowan, Liebowitz & Latman, P.C.

(57) ABSTRACT

Disclosed are an image capture apparatus that includes an image sensor capable of acquiring parallax images, and calculates the amount of parallax while reducing the amount of data that is to be transmitted or recorded, and a method for controlling the same. The image capture apparatus less frequently outputs a second image signal than a first image signal, wherein the first image signal is generated based on all of the photoelectric signals of the plurality of photoelectric conversion units of each pixel, and wherein the second image signal is generated based on at least one of but not all of the photoelectric signals.

18 Claims, 15 Drawing Sheets

(58) Field of Classification Search
CPC ........... H01L 27/14621; H01L 27/1464; H01L 27/1463; H01L 27/14645; G02B 3/0056; G02B 5/201; G02B 27/26
See application file for complete search history.

(56) References Cited

U.S. PATENT DOCUMENTS

| | | | | |
|---|---|---|---|---|
| 2013/0076970 A1* | 3/2013 | Kishi | ...................... | G02B 7/34 348/349 |
| 2013/0083166 A1* | 4/2013 | Shintani | ............. | H04N 13/0029 348/46 |
| 2013/0083230 A1* | 4/2013 | Fukuda | .............. | H04N 5/35563 348/340 |
| 2013/0087875 A1* | 4/2013 | Kobayashi | .......... | H01L 27/1461 257/432 |
| 2013/0093847 A1* | 4/2013 | Yahagi | ............... | H04N 13/0296 348/43 |
| 2013/0176408 A1* | 7/2013 | Ikeda | ................. | H04N 13/0048 348/54 |

* cited by examiner

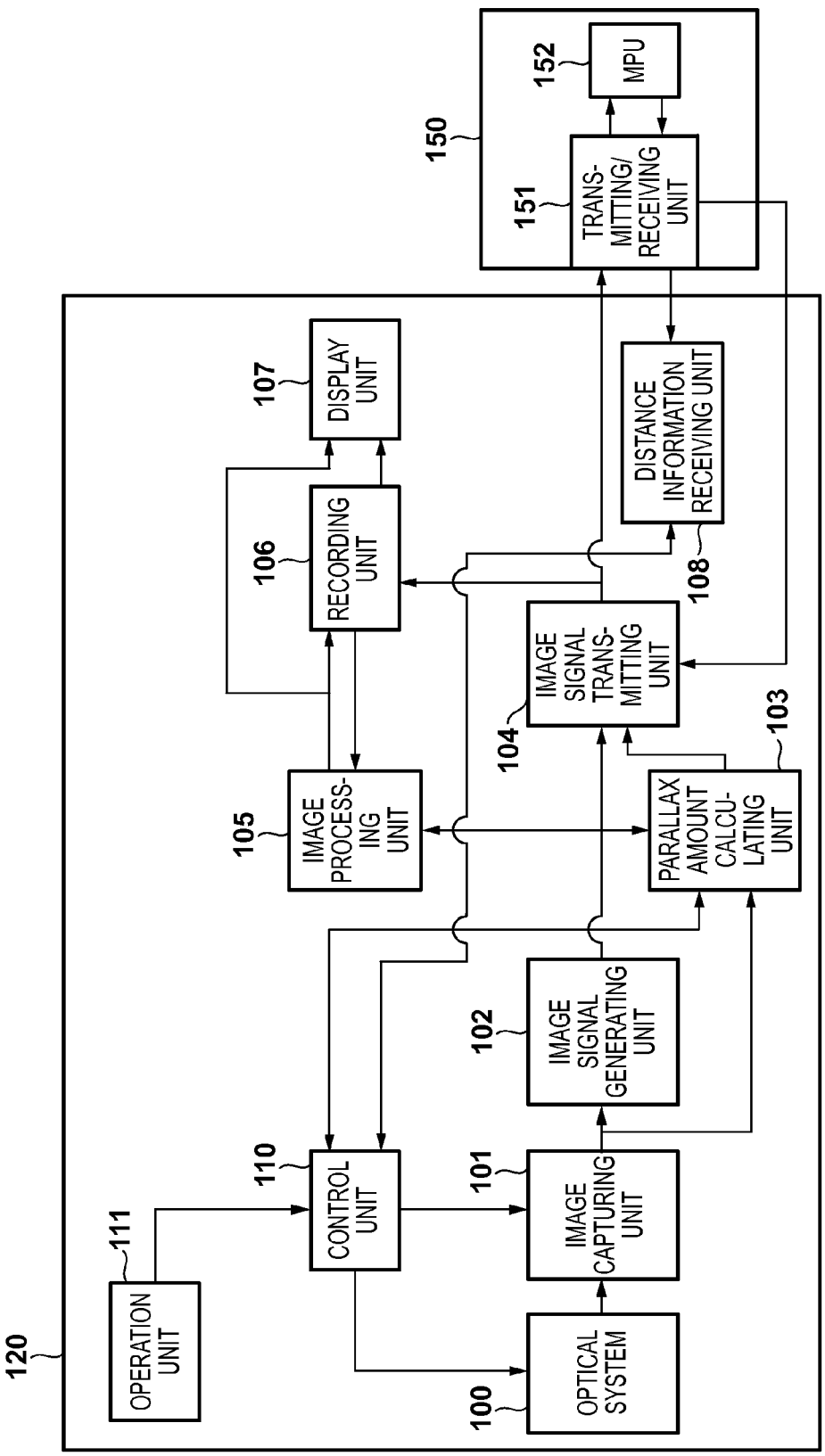

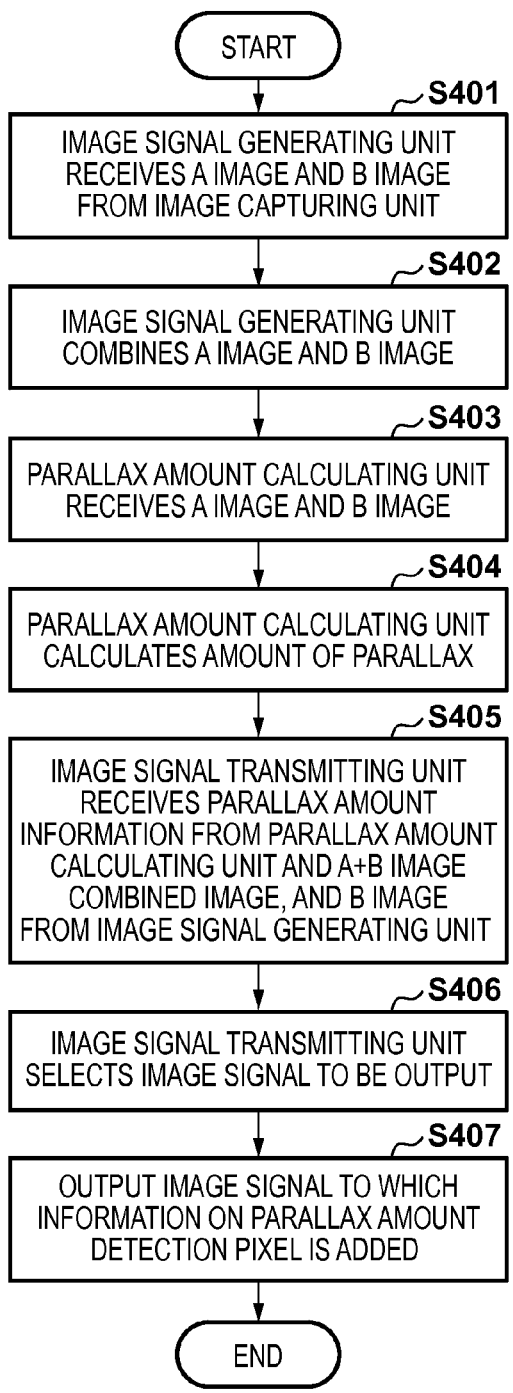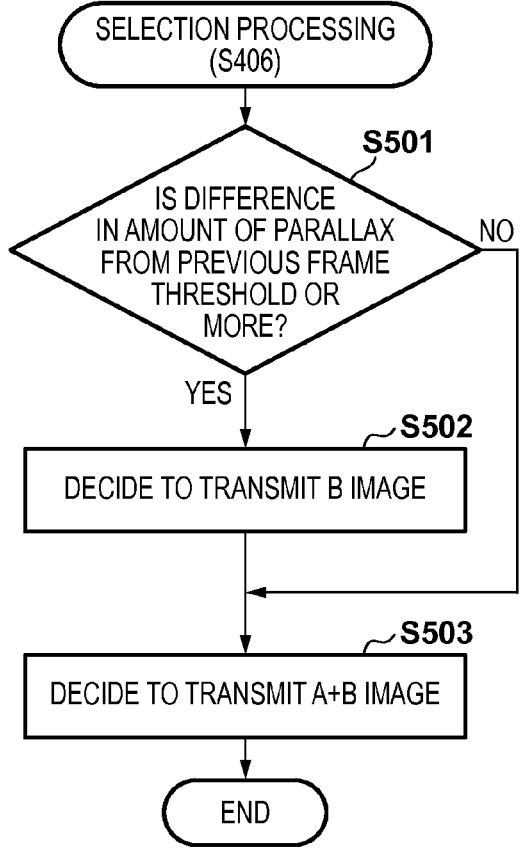
FIG. 3A
FIG. 3B

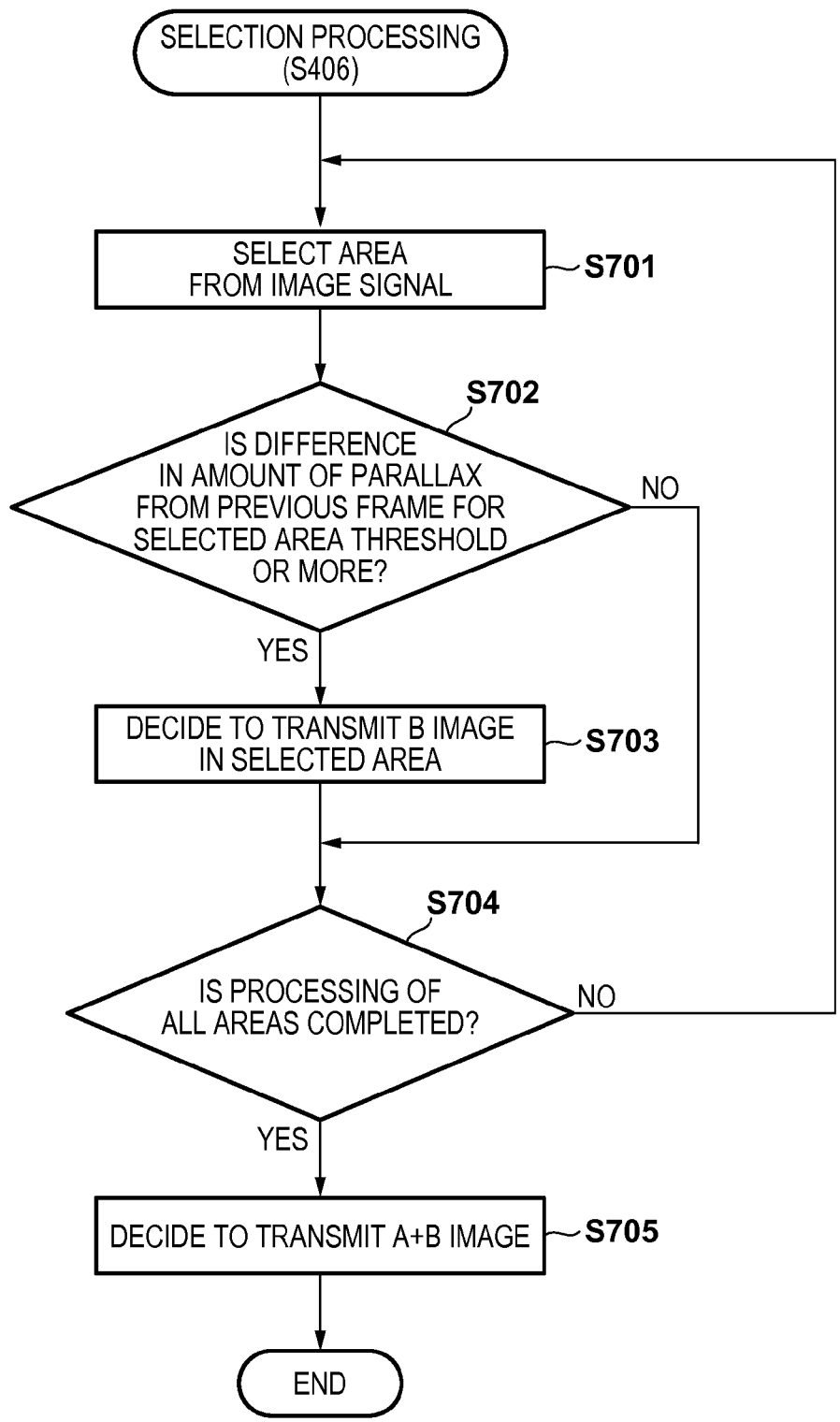

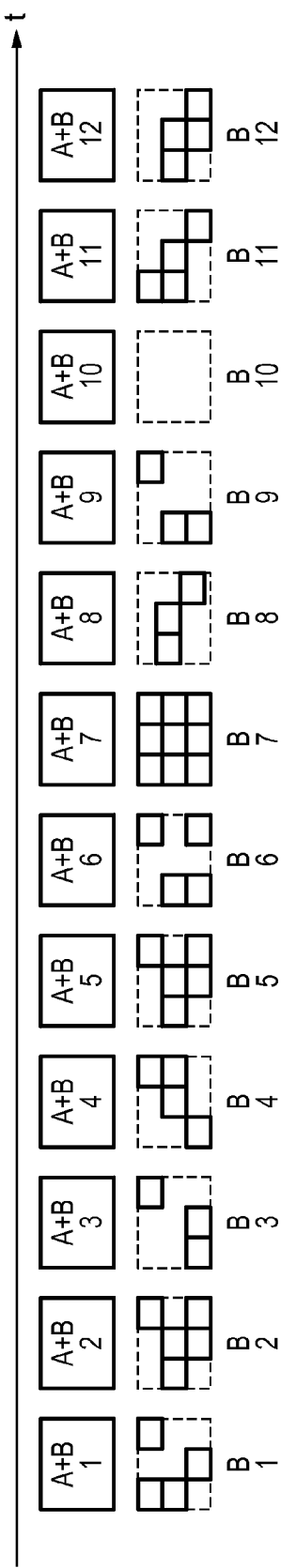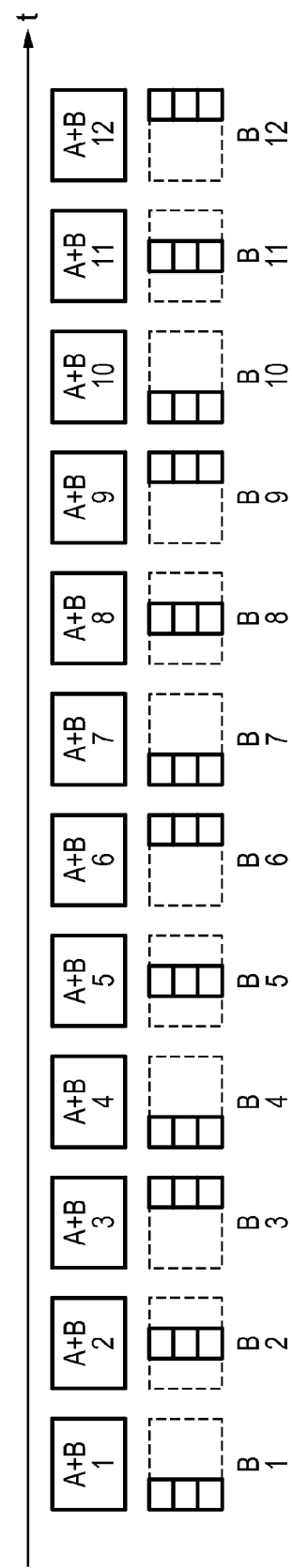

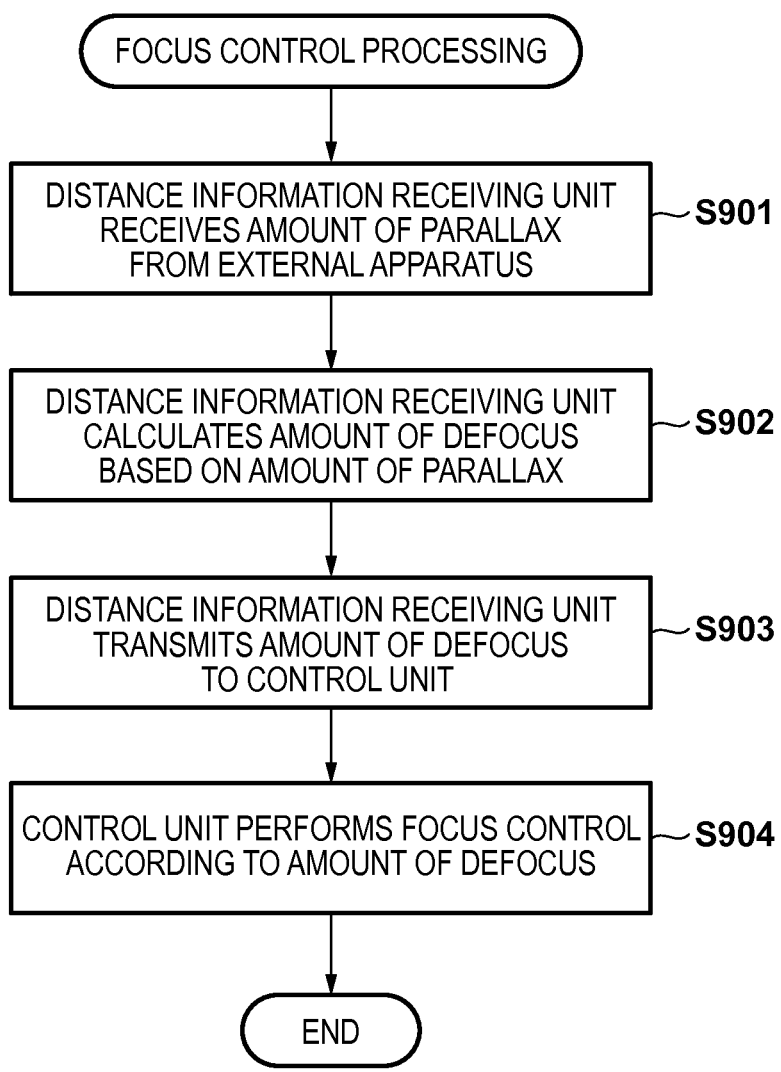

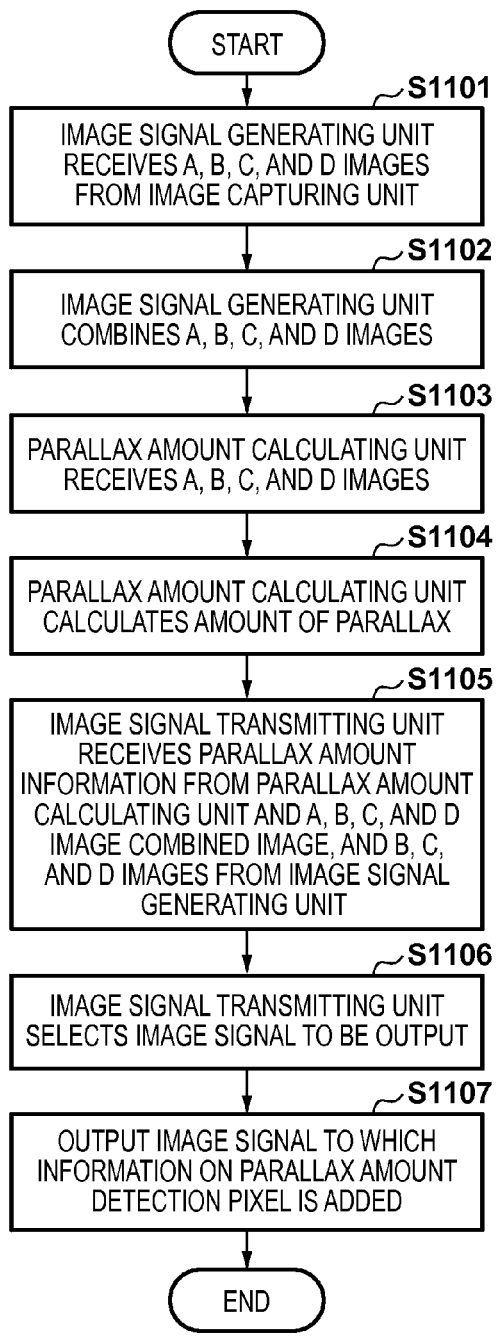
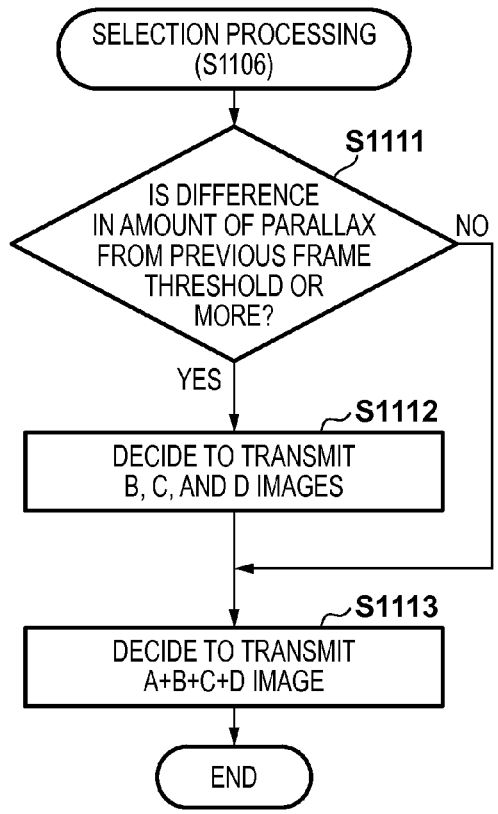

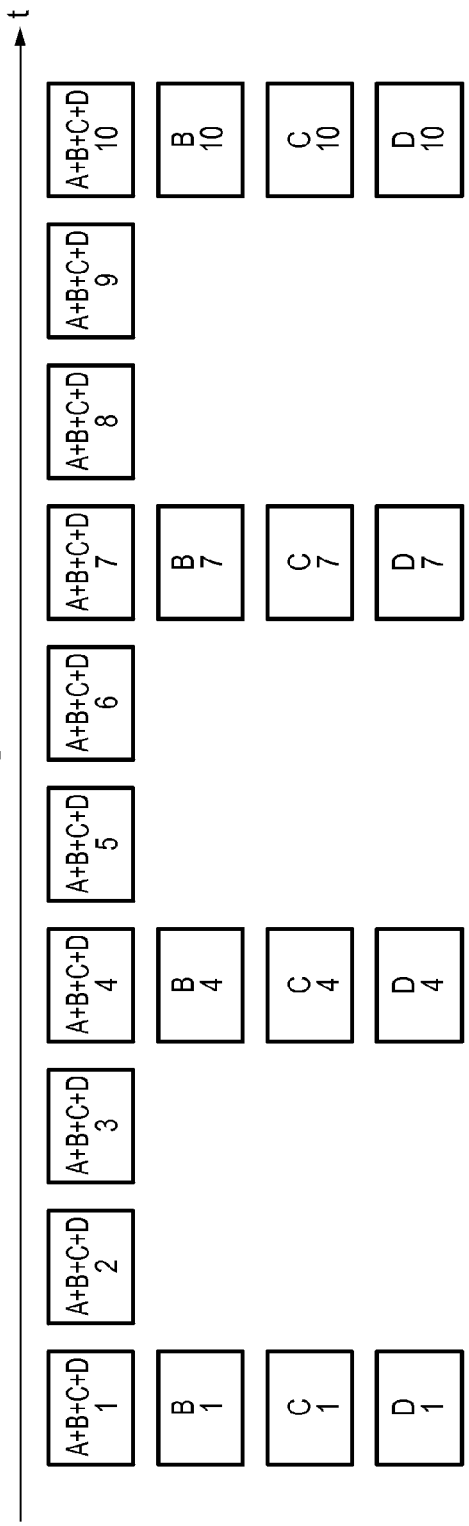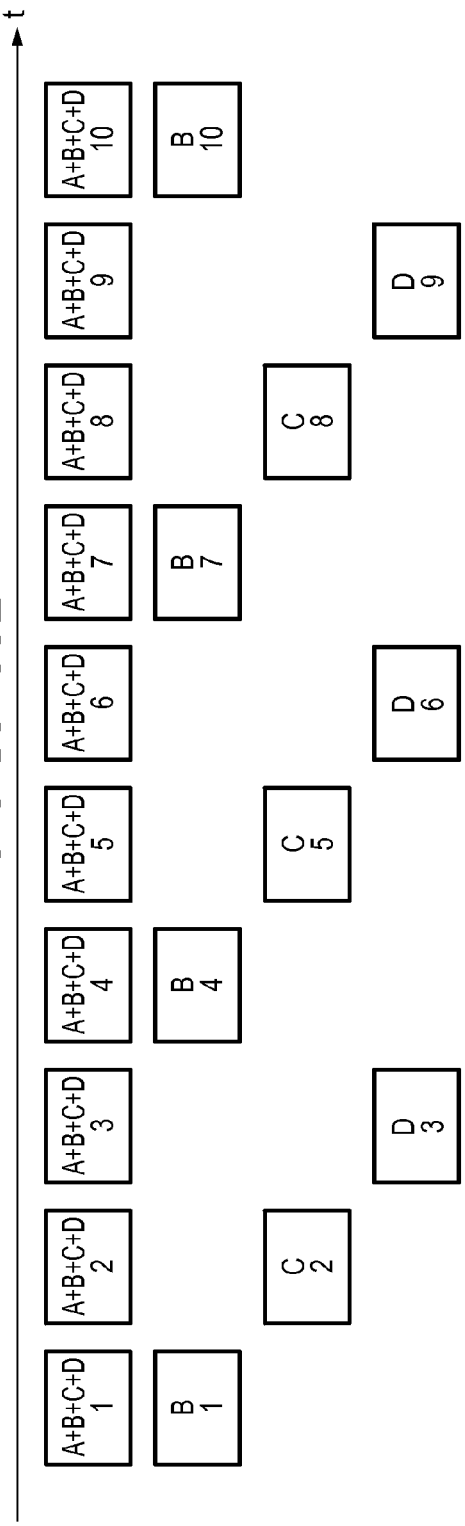

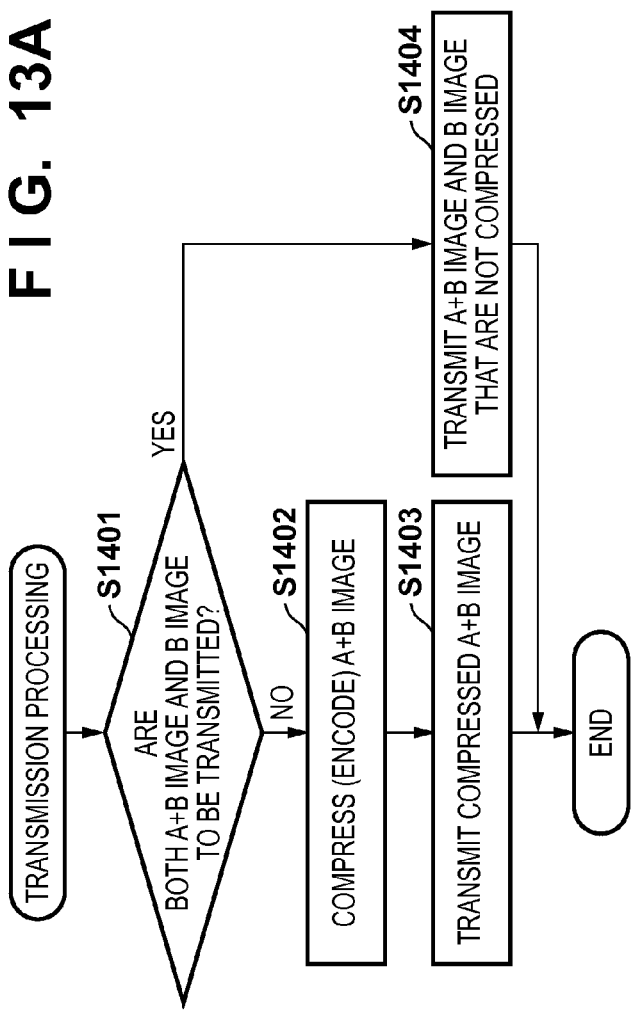
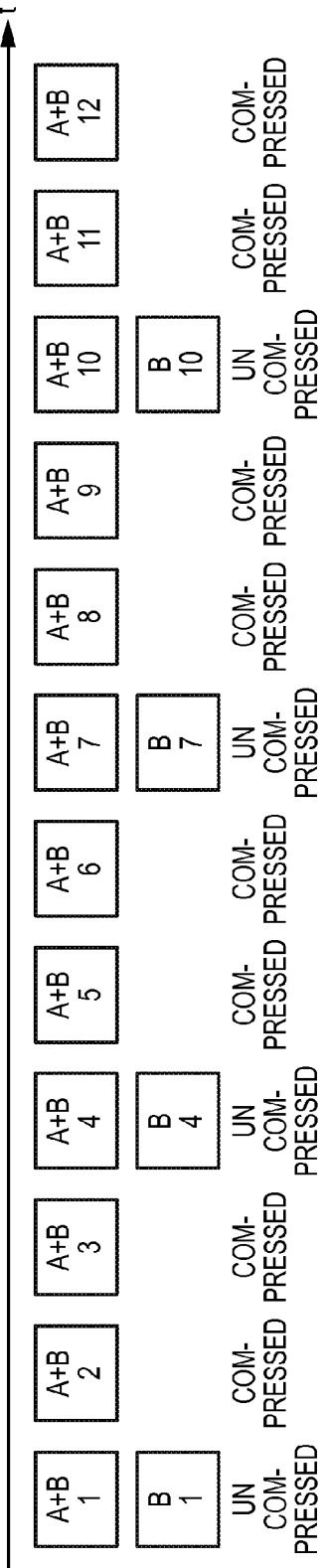
FIG. 13A
FIG. 13B

IMAGE CAPTURE APPARATUS AND METHOD FOR CONTROLLING THE SAME

BACKGROUND OF THE INVENTION

Field of the Invention

The present invention relates to an image capture apparatus and a method for controlling the same, and in particular relates to an image capture apparatus using an image sensor having pixels each including a plurality of photoelectric conversion units, and a method for controlling the same.

Description of the Related Art

An image sensor that includes pixels each configured such that light beams having passed through different partial areas of an exit pupil of an imaging optical system are received by separate photoelectric conversion units is known. Such pixels are used to acquire signals of two images (hereinafter, referred to as an A image and a B image) that have a parallax. Phase-difference detection-based focus detection is possible by obtaining a phase difference between the A image and the B image. Furthermore, it is also possible to generate a range image based on the A image and the B image.

As an application example of the A image and the B image, techniques are known in which amounts of defocus between the A image and the B image in respective small areas of a captured image are obtained and image processing according to the amounts of defocus is applied (Japanese Patent Laid-Open No. 2008-15754), and in which distribution of amounts of defocus is obtained and stored (Japanese Patent Laid-Open No. 2009-124313).

In order to calculate the amounts of defocus for respective small areas of a captured image, an image sensor needs to have a large number of pixels each including a plurality of photoelectric conversion units, as shown in FIGS. 2A and 2B. However, there may be the problem that a processing load for calculating the amounts of defocus increases, making it difficult to perform real-time calculation of the amounts of defocus particularly when a shooting interval is short as in shooting a moving image.

Furthermore, advanced image processing may be needed for acquiring the amount of defocus and distance information for each pixel more exactly. For example, it is common to obtain, as a phase difference or an amount of parallax between the A image and the B image, a phase difference (shift amount) having the highest correlation value, but in the case where a subject has a periodic texture, a plurality of different shift amounts have a high correlation value and thus it may be difficult to calculate a correct value. Furthermore, if there is an area that exists only in one of the A image and the B image, a phase difference or an amount of parallax with respect to this area cannot be obtained.

Accordingly, when an image capture apparatus needs to perform enormous calculation like this, real-time processing at the time of moving image shooting or continuous shooting is difficult with the processing power of the image capture apparatus. Furthermore, there may be a case where, due to a circuit size and the like, hardware for executing complicated processing cannot be mounted on the image capture apparatus. In such a case, the image capture apparatus needs to output image signals of the A image and the B image so that an external apparatus performs calculation of the phase difference or the amount of parallax, generation of a range image, or the like, or the image capture apparatus or the external apparatus needs to execute the same processing with respect to stored RAW data.

However, when image signals of the A image and the B image are output to the external apparatus, for example, when each pixel of the image sensor acquires the A image and the B image, it is necessary to transmit the amount of data that corresponds to a two-fold the number of pixels. Furthermore, the memory capacity needs to be saved also when the data is stored and then image processing is performed thereon. Therefore, a technique for reducing the amount of data that is to be transmitted or stored while enabling calculation of the amount of parallax is needed.

SUMMARY OF THE INVENTION

The present invention was made in view of such a problem, and provides an image capture apparatus that includes an image sensor capable of acquiring parallax images, and can reduce the amount of data that is transmitted or stored while enabling calculation of the amount of parallax, and a method for controlling the image capture apparatus.

According to an aspect of the present invention, there is provided an image capture apparatus comprising: an image sensor that is provided with a plurality of pixels each including a plurality of photoelectric conversion units, wherein each of the photoelectric conversion units generates an photoelectric signal; a first generating unit configured to generate a first image signal for each pixel based on all of the photoelectric signals generated by the plurality of photoelectric conversion units of each pixel; a second generating unit configured to generate a second image signal for each pixel based on at least one of but not all of the photoelectric signals generated by the plurality of photoelectric conversion units of each pixel; and an outputting unit configured to output the first image signal and second image signal, wherein the outputting unit less frequently outputs the second image signal than the first image signal.

According to another aspect of the present invention, there is provided a method for controlling an image capture apparatus, having an image sensor that is provided with a plurality of pixels each including a plurality of photoelectric conversion units, comprising the steps of: acquiring photoelectric signals from the plurality of photoelectric conversion units of each pixel; generating a first image signal for each pixel based on all of the photoelectric signals generated by the plurality of photoelectric conversion units of each pixel; generating a second image signal for each pixel based on at least one of but not all of the photoelectric signals generated by the plurality of photoelectric conversion units of each pixel; and outputting the first image signal and second image signal, wherein the second image signal is outputted less frequently than the first image signal.

Further features of the present invention will become apparent from the following description of exemplary embodiments with reference to the attached drawings.

BRIEF DESCRIPTION OF THE DRAWINGS

FIG. 1 is a block diagram showing a configuration of an image processing system according to embodiments of the present invention.

FIGS. 3A and 3B are flowcharts illustrating the operations of a digital camera of the first embodiment.

FIG. 5 is a flowchart showing the operation of the image signal transmitting unit of the first embodiment.

FIGS. 6A and 6B are diagrams showing examples of image signals that are output by the image signal transmitting unit with the operation of FIG. 5.

FIG. 7 is a flowchart showing the operation using distance information received from an external apparatus, according to the first embodiment.

FIGS. 10A and 10B are flowcharts illustrating the operation of a digital camera of the second embodiment.

FIGS. 11A and 11B are diagrams showing image signals output by the image signal transmitting unit of the second embodiment.

FIGS. 13A and 13B are diagrams illustrating the operation of the image signal transmitting unit according to the fourth embodiment.

DESCRIPTION OF THE EMBODIMENTS

Figure 2A:
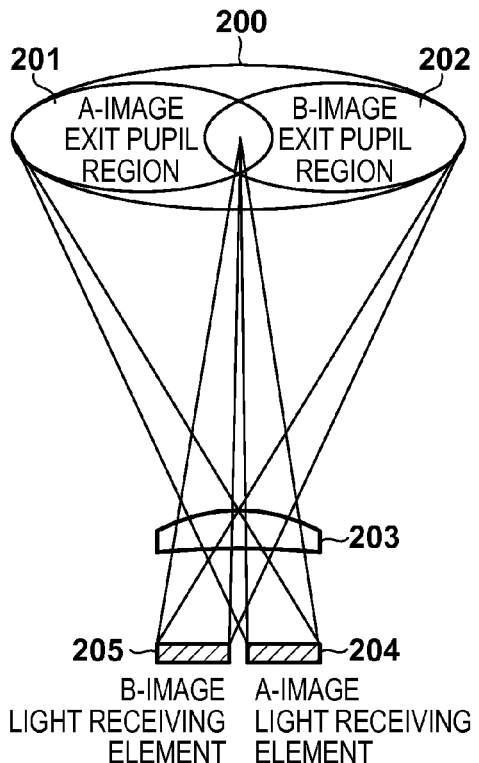
FIGS. 2A and 2B are diagrams showing an example of a configuration of a parallax amount detection pixel and a pixel array of an image sensor according to a first embodiment.

Exemplary embodiments of the present invention will now be described in detail in accordance with the accompanying drawings. Note that the following will describe embodiments in which the present invention is applied to a digital camera serving as an example of an image capture apparatus, but the present invention is applicable to any electronic device provided with a camera.

First Embodiment

FIG. 1 is a block diagram showing examples of functional configurations of a digital camera and an external apparatus that constitute an image processing system according to the present embodiment. The digital camera 120 includes an optical system 100, an image capturing unit 101, an image signal generating unit 102, a parallax amount calculating unit 103, an image signal transmitting unit 104, an image processing unit 105, a recording unit 106, a display unit 107, and a distance information receiving unit 108. Note that ordinarily provided configurations of the digital camera that are not directly relevant to the embodiment are not shown in the drawings.

A control unit 110 includes, for example, a programmable processor (MPU), and executes programs stored in a nonvolatile memory with the MPU to control functional blocks, thereby realizing the processing of the digital camera 120 that includes the operation according to the embodiments that will be described below. The control unit 110 includes a volatile memory such as a RAM that is used for execution of the programs, for example. In the nonvolatile memory, various types of setting values, GUI data, and the like are also stored.

The optical system 100 is an imaging optical system and includes a focus lens, an aperture/shutter, and the like. The control unit 110 drives the focus lens to control the focal distance of the optical system 100 or control the aperture size or opening/closing operation of the aperture/shutter.

The image capturing unit 101 includes an image sensor that photoelectrically converts a subject image that is formed by the optical system 100 on an imaging surface into electrical signals (image signals) indicating the subject image. Note that "image signals" are a set of signals (pixel signals) acquired from pixels in single shooting. The image signal generating unit 102 can directly output the image signals received from the image capturing unit 101 or output an image signal obtained by combining a plurality of image signals. The parallax amount calculating unit 103 calculates the amount of parallax among a plurality of image signals received from the image signal generating unit 102. The image signal transmitting unit 104 receives the image signals from the image signal generating unit 102 and information on the amount of parallax from the parallax amount calculating unit 103, and can select the entire or parts of the image signals that are to be output.

The image signal transmitting unit 104 includes at least one of a wired communication interface and a wireless communication interface, and outputs the image signals or the information on the amount of parallax to the external apparatus 150 that is communicably connected to the digital camera 120 or the recording unit 106. The external apparatus 150 is an apparatus such as a personal computer or a cloud computer that has a higher processing power than that of the digital camera 120.

The image processing unit 105 applies predetermined image processing on the image signals received from the image signal generating unit 102 or image signals that are recorded in a storage device or a detachable recording medium using the recording unit 106. The predetermined image processing may include, for example, white balance processing, developing processing such as noise reduction processing, edge enhancement processing, and gamma processing, blurring processing, and the like, but may also include another image processing.

The recording unit 106 records image signals developed by the image processing unit 105, image signals output by the image signal transmitting unit 104, and the like into a built-in storage device such as hard disk or a semiconductor device or a detachable recording medium in accordance with the control of the control unit 110. Furthermore, the recording unit 106 can read out the recorded image signal in accordance with the control of the control unit 110.

The display unit 107 performs display based on the image signals developed by the image processing unit 105 or the image signals recorded in the recording unit 106. The display unit 107 further displays a UI on which a user gives various types of instructions and settings to the digital camera 120.

The distance information receiving unit 108 includes at least one of a wired communication interface and a wireless communication interface, and receives the distance information calculated by the external apparatus 150 to supply the distance information and information based on the distance information to the control unit 110.

An operation unit 111 is a group of input devices that are used for a user to give various types of instructions including a shooting preparation instruction and a shooting instruction to the digital camera 120 or to configure various types of settings, and that includes buttons, switches, a touch panel, and the like.

Note that at least some of the functional blocks excluding the optical system 100, the display unit 107, and the operation unit 111 may also be realized by the control unit 110 using software. Furthermore, a plurality of functional blocks may also be realized by a piece of hardware.

The external apparatus 150 may be an arbitrary electronic device that is capable of communicating with the digital camera 120, such as for example a general-purpose computer, and is communicably connected to the digital camera 120 via a transmitting/receiving unit 151. An MPU 152 receives image signals and the like from the digital camera 120 via the transmitting/receiving unit 151, calculates distance information using a predetermined method, and transmits the distance information to the digital camera 120 via the transmitting/receiving unit 151. Note that the MPU 152 includes a RAM and a ROM, and programs for performing communication with the digital camera 120 and for executing processing for calculating the distance information are stored in the ROM. The programs may, of course, be read into the RAM from a storage device such as a hard disk drive and executed.

FIG. 2A shows an example of a configuration of a pixel (parallax detection pixel) of the image capturing unit 101 of the present embodiment, the pixel being capable of acquiring parallax images. The pixel includes a microlens 203 and two photoelectric conversion units or light receiving elements 204 and 205, in which the light receiving element 204 receives a light beam that has passed through an exit pupil region 201 and the light receiving element 205 receives a light beam that has passed through an exit pupil region 202. Assume that an image signal that can be acquired by the light receiving element 204 is of an A image and an image signal that can be acquired by the light receiving element 205 is of a B image, the A image and the B image are parallax images. Phase-difference detection-based focus detection can be performed by obtaining phase differences between the A images and the B images that are acquired from a plurality of pixels. Furthermore, it is also possible to generate a range image based on the A images and the B images.

When, as shown in FIG. 2A, the photoelectric conversion units of the pixel are divided (arranged) in the horizontal direction, an amount of parallax in the horizontal direction can be obtained between the A image and the B image. If each pixel has photoelectric conversion units divided in the vertical direction, an amount of parallax in the vertical direction can be obtained between the A image and the B image. Note that FIG. 2A shows the configuration in which the pixel has two equally-divided photoelectric conversion units, but the pixel may also have three or more divided photoelectric conversion units. For example, each pixel may also have four photoelectric conversion units that are equally divided into two in the vertical direction and two in the horizontal direction. However, in the following, for ease of description and understanding, it is assumed that all of the parallax detection pixels of the image capturing unit 101 of the present embodiment have two photoelectric conversion units equally divided in the horizontal direction.

Figure 2B:
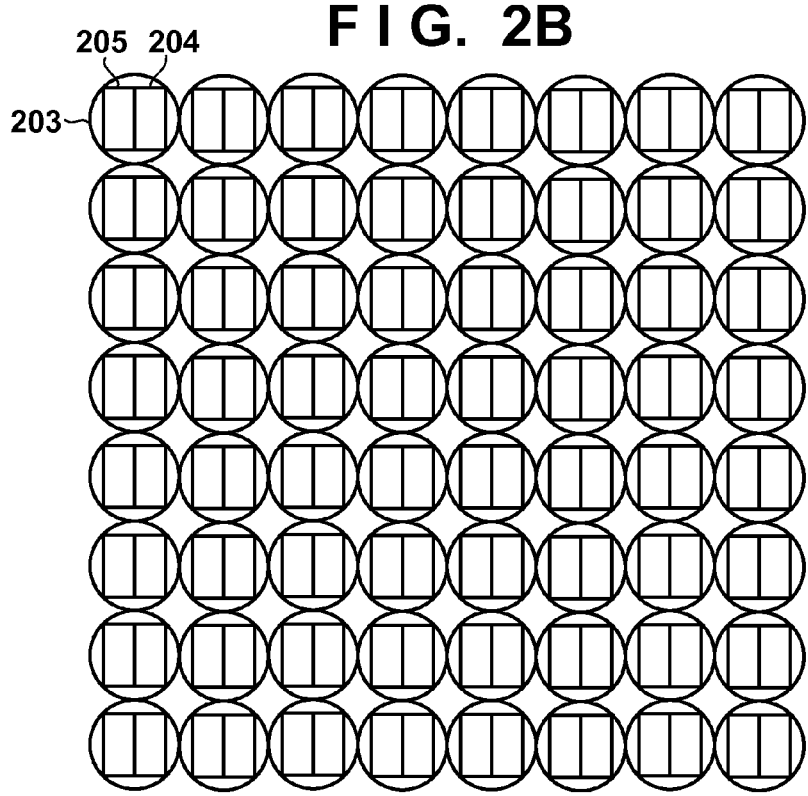

FIG. 2B is a diagram schematically showing an example of a pixel array of the image capturing unit 101 according to the present embodiment, and shows an extracted part of the pixel area. As shown in FIG. 2B, all of the pixels of the image capturing unit 101 of the present embodiment are parallax detection pixels having the configuration of FIG. 2A. Accordingly, by single shooting, image signals of A images and B images that have the same configuration (n pixels in the horizontal direction×m pixels in the vertical direction) can be acquired. Note that it is not essential that all the pixels of the image capturing unit 101 are parallax detection pixels, and a configuration is also possible in which parallax detection pixels are arranged only in a specific area.

Then, the processing operation that is performed on image signals of an A image and a B image at the time of shooting using the digital camera 120 according to the present embodiment will be described with reference to the flowchart of FIG. 3A. This processing is executed after, for example, a shooting start instruction is given from the operation unit 111, the control unit 110 controls the aperture/shutter of the optical system 100 to expose the image capturing unit 101 to light, and image signals of an A image and a B image are read from each pixel of the image capturing unit 101.

In step S401, the image signal generating unit 102 receives the image signals read out from the image capturing unit 101. The image signals that are received are RAW image signals of the A image and the B image that are constituted by a group of signals independently read out from the light receiving elements 204 and 205 of the pixels of the image capturing unit 101. When the image capturing unit 101 includes a color filter of, for example, the Bayer arrangement, both the A image and the B image are RAW image signals of the Bayer arrangement.

In step S402, the image signal generating unit 102 combines the RAW image signals of the A image and the B image by summing up the signals read out from the same pixel, and transmits the combined image signal (first image signal) to the image processing unit 105 and the image signal transmitting unit 104. By summing up the outputs of the light receiving elements 204 and 205 of the same pixel, the summed-up signal serves as a signal received by the entire pixel and can be regarded as an output of an ordinary pixel including undivided photoelectric conversion unit. Therefore, the combined image signal can be used as a basic image signal for display and storage.

The image processing unit 105 applies the above-described developing processing on the received basic image signal. Furthermore, the received basic image signal on which special processing for recording or display is applied is transmitted to the recording unit 106 and the display unit 107. The special processing for recording may be, for example, encoding processing or data file generation processing (such as generation and addition of a file header). Furthermore, the special processing for display may be resizing processing according to the resolution of the display unit 107, and the like. The processing of the image processing unit 105 is similar to the processing that is executed in an ordinary digital camera, and thus further description thereof is omitted.

In step S403, the parallax amount calculating unit 103 receives the image signals of the A image and the B image. The image signals of the A image and the B image may be received from the image capturing unit 101 directly or via the image signal generating unit 102. Then, in step S404, the parallax amount calculating unit 103 calculates the amount of parallax using the received image signals of the A image and the B image.

The method for calculating the amount of parallax is not particularly limited, and may be a method for obtaining the amount of parallax based on the shift amount at which the correlation amount is the highest, as in the method ordinarily executed in automatic phase-difference detection-based focus detection. Specifically, one of an A image and a B image that are obtained from a predetermined plurality of pixels in the horizontal direction is shifted to the other one, and a correlation value between the different shift amounts is calculated. Then, the amount of parallax needs only to be calculated based on the shift amount at which correlation between the A image and the B image is the highest.

However, for example, when an image is divided into small areas and an amount of parallax in each small area is obtained or when shooting with a high frame rate, such as moving image shooting, is performed, it may be difficult to perform real-time calculation of the amount of parallax for each frame (captured image). In such a case, the amount of parallax may also be calculated by a simple method in which the accuracy is low but the amount of calculation is small. For example, it is also possible to calculate the sum of differences of corresponding pixels of the A image and B image for each small area without shifting the A image and the B image, and to assign the larger amount of parallax to the area having the larger sum of differences. Alternatively, the calculation amount may be reduced by reducing the area for which the amount of parallax is calculated. The parallax amount calculating unit 103 transmits the calculated amount of parallax to the image signal transmitting unit 104.

The parallax amount calculating unit 103 can calculate at least two types of amounts of parallax that have different loads, and the control unit 110 can be configured to decide which method is used to calculate the amount of parallax and to set the decided method for the parallax amount calculating unit 103. The determination method is not particularly limited, but, for example, when the load of the parallax amount calculating unit 103 exceeds a predetermined level or image signals are read in a temporal sequence as in a case where the shooting parameter shows continuous shooting or moving image shooting, the control unit 110 can decide to perform calculation using a method with a small load. These are merely examples, and another parameter may also be used or determination in three or more stages may also be performed.

In step S405, the image signal transmitting unit 104 receives the basic image signal generated by the image signal generating unit 102 in step S402, and the amount of parallax calculated by the parallax amount calculating unit 103 in step S404. The image signal transmitting unit 104 selects the image signal or the image area that is to be output to the external apparatus 150 and the recording unit 106 (step S406). Then, the image signal transmitting unit 104 adds information on a parallax amount detection pixel to the selected image signal, and outputs the selected image signal to which the information is added to the external apparatus 150, which may be a personal computer or a cloud computer, or the recording unit 106 (step S407). Note that the destination external apparatus 150 is preset. Furthermore, the recording unit 106 records entire or some of the image signals output from the image signal transmitting unit 104.

The information on a parallax amount detection pixel refers to information indicating whether or not the image signal is generated from a parallax amount detection pixel, and information indicating which pupil region light that is received by a pixel generating the image signal has passed through. In the case of the present embodiment, information indicating that an image signal is generated from a parallax amount detection pixel and information indicating that an image signal is obtained by summing up an image signal generated from an A-image light receiving element and an image signal generated from a B-image light receiving element is added to the basic image signal. Information indicating that an image signal is generated from a parallax amount detection pixel and information indicating that an image signal is generated from the B-image light receiving element are added to the image signal of the B image (second image signal). The present embodiment is described assuming that all the pixels are parallax amount calculation pixels, but when some of the pixels of the image sensor are parallax amount detection pixels, positional information on parallax amount detection pixels may also be added.

The information on a parallax amount detection pixel is used when the amount of parallax is calculated by the external apparatus 150 or the amount of parallax is calculated by the digital camera 120 (parallax amount calculating unit 103) based on recorded data. For example, if it is recognized that the image signals that were recorded or transmitted are a basic image signal obtained by combining the signals of the A image and the B image, and the image signal of the B image, it will be possible to generate an image signal of the A image by subtracting the image signal of the B image from the basic image signal in later processing. Then, the amount of parallax can be calculated based on the generated image signal of the A image and the received (read-out) image signal of the B image. Furthermore, when some of the pixels of the image sensor are parallax amount detection pixels and the positions of the parallax amount detection pixels are recognized, processing for calculating the amount of parallax can be executed only at the positions of the parallax amount detection pixels.

The foregoing procedure is executed each time shooting is performed (for each frame) by the image capturing unit 101. Note that "frame" means an image obtained by single shooting, and may also be used for a still image such as an image obtained each time of shooting of continuous shooting, without being limited to an image constituting a moving image.

The selection processing performed by the image signal transmitting unit 104 in step S406 will further be described with reference to FIGS. 3B and 4A to 4D. The flowchart shown in FIG. 3B shows the operation that is executed for each frame by the image signal transmitting unit 104.

In step S501, the image signal transmitting unit 104 determines whether or not a change between the amount of parallax calculated in the previous frame and the amount of parallax calculated in the current frame is a threshold or more. The threshold may be defined based on the shooting scene or the F-number at the time of shooting. Furthermore, when a change in the amount of parallax from the previous frame is calculated, a large weight may also be given to the change in the amount of parallax in the center of the screen or an area in which the main subject is present. The image signal transmitting unit 104 advances the procedure to step S502 if the change in the amount of parallax is a threshold or more, and otherwise, to step S503.

In step S502, the image signal transmitting unit 104 decides to transmit the image signal of the B image. On the other hand, in the S503, the image signal transmitting unit 104 decides to transmit the image signal (basic image signal) obtained by combining the A image and the B image. For example, when a range image is generated by the external apparatus 150 or is generated by the digital camera 120 after shooting, only information needed for calculating the amount of parallax suffices and it is thus not necessary to transmit a frame having the amount of parallax that is not varied (or hardly varied) from the previous frame.

Accordingly, the amount of data is reduced in this way by transmitting the image signal of the B image, in adding to the basic image signal, only in a frame having a large change in the amount of parallax from the previous frame. Furthermore, the B image is defined as the target that is to be transmitted when, instead of a change in the amount of parallax from the previous frame, a change in the amount of parallax from the frame in which the B image is transmitted last time is a threshold or more, or when the amount of parallax in the current frame is a threshold or more. Accordingly, by selecting a part or entire of the B image as a target that is to be transmitted when a predetermined parameter is met, it is possible to reduce the amount of data on the B image that is to be transmitted.

Figure 4A:
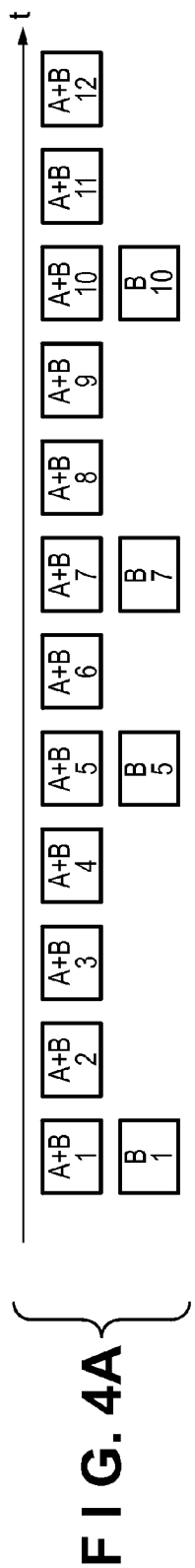
FIGS. 4A to 4D are diagrams schematically showing the operation of an image signal transmitting unit of the first embodiment.

FIGS. 4A to 4D are diagrams schematically showing examples of image signals that are selected as targets to be transmitted by the image signal transmitting unit 104 in step S406 and are output in step S407 in a temporal sequence. Each frame is indicated with the type of an image signal that is to be transmitted and the frame number. For example, if frames 1, 5, 7, and 10 are determined to have a large change in the amount of parallax from the previous frame, transmission as shown in FIG. 4A will be performed.

Figure 4B:
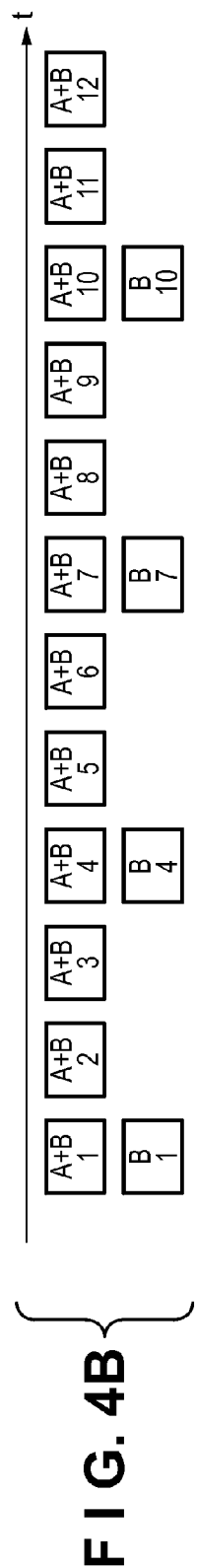

Alternatively, as shown in FIG. 4B, the B image may be transmitted intermittently in a predetermined cycle. The cycle in which the B image is transmitted can be determined depending on, for example, the upper limit of the transmission rate when an image signal is transmitted from the image signal transmitting unit 104 to the external apparatus 150.

Figure 4C:
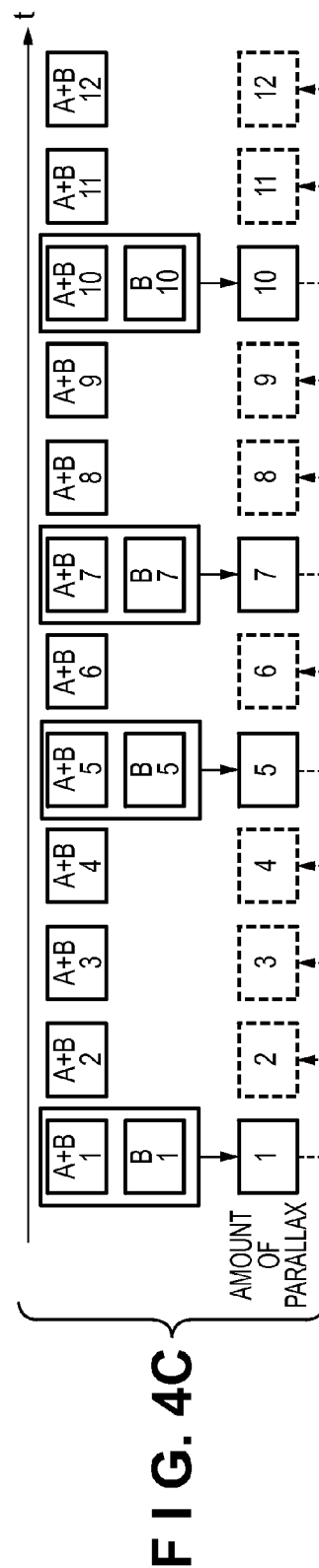

FIG. 4C schematically shows the method for calculating the amount of parallax when image signal output as shown in FIG. 4A is performed. A basic image signal is obtained by summing up image signals of the A image and the B image, and thus the image signal of the A image can be obtained based on the basic image signal and the image signal of the B image. Therefore, in frames 1, 5, 7, and 10 in which an image signal of the B image is transmitted, the amount of parallax can be calculated. In frames in which no image signal of the B image is transmitted, the amount of parallax may be calculated, as shown in a dotted line of FIG. 4C, by interpolating the amounts of parallax calculated immediately before and after. Alternatively, the frame in which no image signal of the B image is transmitted is a frame in which a change in the amount of parallax from the previous frame is small, and thus the amount of parallax that is calculated immediately before or after may directly be used.

Furthermore, the description with reference to FIGS. 3B and 4A to 4D has described a configuration in which the entire of the B image of the frame having a large change in the amount of parallax from the previous frame is selected as a target to be transmitted, but a partial area of the B image may be transmitted. The operation of the image signal transmitting unit 104 in step S406 in this case will be described with reference to FIGS. 5 and 6A and 6B.

In step S701, the image signal transmitting unit 104 selects an area of the image shown by the basic image signal. This area may be one of the areas obtained by dividing the image in grids, or one of the areas obtained by dividing the image using another arbitrary method. Then, in step S702, the image signal transmitting unit 104 calculates a difference in the amount of parallax from the previous frame for the area selected in step S701.

The image signal transmitting unit 104 advances the procedure to step S703 when the difference amount is a threshold or more, and otherwise to step S704. Note that in the case of the first frame, the procedure advances to step S703. In step S703, the image signal transmitting unit 104 decides to transmit the image signal of the B image in the area selected in step S701. In step S704, the image signal transmitting unit 104 determines whether or not processing has been completed on all the areas of the basic image signal, and if there is an area on which the processing is not yet performed, the procedure returns to step S701, where processing on the next image area is performed. On the other hand, if processing is completed on all the areas, the image signal transmitting unit 104 advances the procedure to step S705, where it is decided to transmit a basic image signal.

FIG. 6A is a diagram schematically showing an example of image signals that are output by the image signal transmitting unit 104 when the selection processing shown in FIG. 5 was performed. The image signal of the B image is transmitted only in the image areas that is indicated by frames with a solid line in the drawing and in which a change in the amount of parallax from the previous frame is large. Alternatively, as shown in FIG. 6B, the image areas of the B image in which image signal is transmitted may also be changed in a cyclic manner. As shown in FIGS. 6A and 6B, when an image signal is transmitted with respect to only a part of the B image, the image signal transmitting unit 104 adds information on an image division rule and information for specifying the area in which the B image is transmitted to the information on a parallax amount detection pixel. Note that the amount of parallax that was evaluated for the entire frame is large for a predetermined consecutive number of frames, a configuration is also possible in which evaluation unit of the amount of parallax may be changed to a small area so as to reduce the amount of data.

The image signals that were output from the image signal transmitting unit 104 in such a manner are processed by the external apparatus 150 which may be a personal computer or a cloud computer, and distance information is calculated. In the external apparatus 150, as described with reference to FIG. 4C for example, the amount of parallax is calculated based on the received image signals, and is transmitted back to the digital camera 120 as the distance information. The external apparatus 150 can calculate the amount of parallax based on how the image signal of the B image is transmitted, using the information on a parallax amount detection pixel that is transmitted together with the image signals. In the external apparatus 150, the more exact amount of parallax can be calculated than in the parallax amount calculating unit 103.

Note that the external apparatus 150 may be an arbitral electronic device on which an application for receiving image signals from the digital camera 120, calculating distance information, and transmitting the calculated distance information back to the digital camera 120 runs, and is, for example, a general-purpose computer such as a personal computer. Basically, the external apparatus 150 has a higher processing power than that of the digital camera 120.

Note that when, as shown in FIGS. 6A and 6B, the image signals of the B image of only some areas are transmitted, the external apparatus 150 can calculate, by a predetermined method, the amount of parallax for the area in which no image signal is transmitted. For example, with respect to this area, the amount of parallax calculated temporally immediately before or after for this area may be interpolated, or the amount of parallax that was calculated immediately before may be used directly.

The distance information receiving unit 108 receives the distance information calculated in the external apparatus 150. The distance information is information that is calculated using the image signal that was transmitted by the image signal transmitting unit 104 to the external apparatus 150. The distance information refers to a range image in which each pixel has distance information for example, an amount of parallax, an amount of defocus, and the like. In the present embodiment, it is assumed that the distance information is the amount of parallax.

The flowchart shown in FIG. 7 shows an example of the operation when the digital camera 120 perform focus control using the distance information calculated in the external apparatus 150.

In step S901, the distance information receiving unit 108 receives distance information (here, the amount of parallax) from an external apparatus. Note that when distance information is received from the external apparatus 150, the type or content of the distance information may be preset, or the external apparatus 150 may be configured to perform notification of these pieces of information together with the distance information. Here, as an example, the external apparatus 150 is assumed to calculate the amount of parallax (shift amount) for respective small areas obtained by dividing an image in grids.

In step S902, the distance information receiving unit 108 converts the received amount of parallax into the amount of defocus. The conversion of the amount of parallax into the amount of defocus can be performed using optical parameters such as a focus lens position of the optical system 100, and a pitch of pixels of the image sensor of the image capturing unit 101. The distance information receiving unit 108 acquires, in addition to the optical parameters and the pixel pitch, information on the area for which the amount of defocus is to be obtained from the control unit 110. The area for which the amount of defocus is to be obtained may be, for example, information on the position and size of the set focus detection area. The focus detection area may be an area set by a user, or a main subject area that is determined based on the result of subject detection, such as face detection.

In step S903, the distance information receiving unit 108 transmits the calculated amount of defocus to the control unit 110. Then, in step S904, the control unit 110 drives the focus lens of the optical system 100 according to the received amount of defocus, and performs focus control.

For example, during moving image shooting, the transmission processing described with reference to FIG. 3A and the focus control processing described with reference to FIG. 7 are performed continuously so that recording of moving images and focus control are performed. Note that the present embodiment has described a configuration in which the distance information receiving unit 108 calculates the amount of defocus based on the amount of parallax. However, it is also possible that information needed for acquiring the amount of defocus from the amount of parallax, such as optical parameters and a pixel pitch of the digital camera 120, are stored in advance in the external apparatus 150 or are transmitted together with the image signals to the external apparatus 150, so that the external apparatus 150 calculates the amount of defocus. In this case, the distance information receiving unit 108 needs only to transmit the received amount of defocus to the control unit 110, and the control unit 110 selects the amount of defocus of the necessary area and drives the focus lens.

Accordingly, by transmitting data on parallax images in a range in which they are used for calculation of the amount of parallax to the external apparatus 150, efficient data transmission can be achieved while reducing the amount of data that is to be transmitted.

Furthermore, the digital camera 120 may also execute image processing after shooting, for example, apply image processing according to the amount of defocus to the basic image signal, using the basic image signal and the image signal of the B image that are recorded by the recording unit 106 of the digital camera 120.

Figure 8:
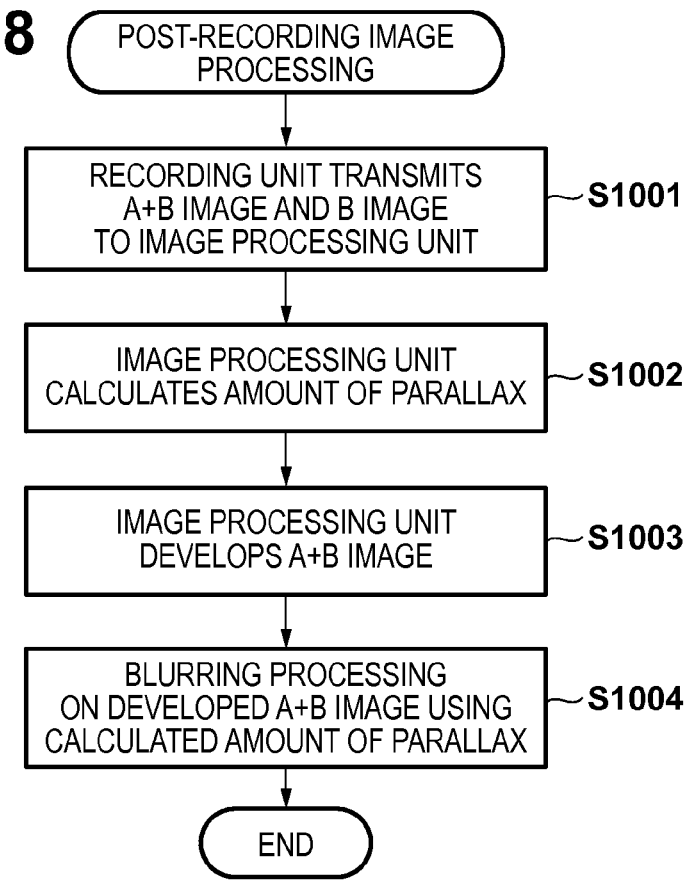
FIG. 8 is a flowchart of post-recording image processing of the first embodiment.

FIG. 8 is a flowchart showing the operation of post-recording image processing using the image signal recorded by the recording unit 106. This processing may be executed in accordance with a user's instruction that was given via the operation unit 111 after recording, or may be automatically executed when a predetermined condition that, for example, the processing load of the digital camera 120 is reduced to a threshold or less is met.

In step S1001, the control unit 110 reads out, of the image signals recorded in the recording unit 106, the basic image signal that is to be subjected to image processing and the image signal of the B image that is recorded in association with the basic image signal, and transmits the read signals to the image processing unit 105.

In step S1002, the image processing unit 105 calculates the amount of parallax. The image processing unit 105 can perform more exact parallax amount calculation processing than simple processing performed by, for example, the parallax amount calculating unit 103 with the frame rate as in moving image shooting or continuous shooting. The amount of parallax may also be obtained for, for example, each small area or per unit of pixel.

In step S1003, the image processing unit 105 performs processing for developing the basic image signal. The developing processing refers to white balance processing, noise reduction processing, edge enhancement processing, gamma processing, or the like. The image after the developing processing is of YUV422 or RGB3 plain type.

In step S1004, the image processing unit 105 applies the image processing using the amount of parallax calculated in step S1002 to the developed basic image signal. The type of the image processing is not limited, but the image processing may be, for example, blurring processing. The blurring processing may be processing in which the degree of blurring is changed according to the amount of parallax, as disclosed in Patent Document 1 for example. Accordingly, even if processing with a complicated algorithm cannot be performed at the frame rate at the time of moving image shooting or continuous shooting, by recording image signals sufficient for calculating the amount of parallax in the recording unit 106, it is possible to perform calculation of the amount of parallax and image processing to which the calculation result is applied with high accuracy after the shooting.

As has been described above, according to the present embodiment, the digital camera including the image sensor capable of acquiring parallax images can calculate the amount of parallax while reducing the amount of data that is to be transmitted or recorded. Therefore, it is possible to realize real-time processing using an external apparatus, or save the capacity of a recording medium.

Figure 4D:
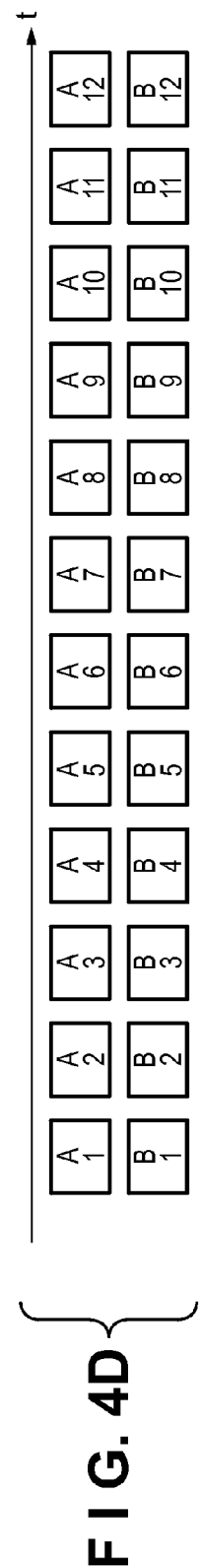

Note that the data recorded in the recording unit 106 may be such that when, for example, all data of image signals are desired to be stored, an A image and a B image are output for each frame as shown in FIG. 4D.

Furthermore, depending on the speed of a communication line to the external apparatus 150, the resolution of the image signal that is to be transmitted to the external apparatus 150 may be reduced, or the image signal that is obtained by applying the above-described processing to not the entire frame but only a part that corresponds to the focus detection area may be transmitted.

Second Embodiment

Hereinafter, a second embodiment of the present invention will be described with reference to the drawings.

Figure 9:
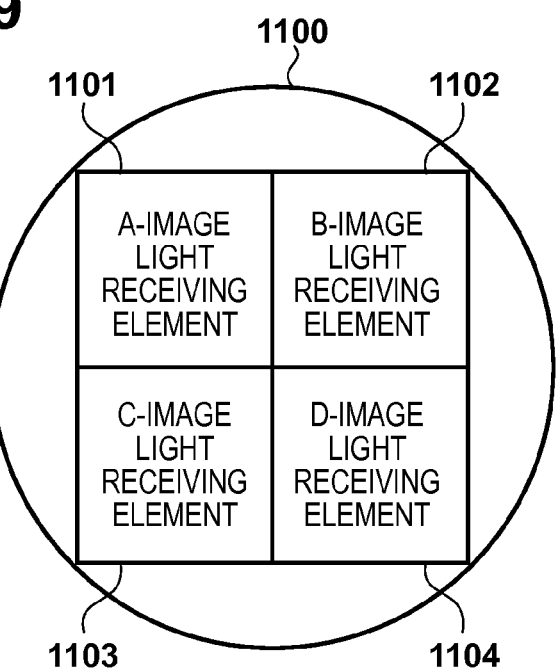
FIG. 9 is a diagram showing an example of a configuration of a parallax amount detection pixel according to a second embodiment.

The present embodiment differs from the first embodiment in that each pixel of the image sensor is configured to include light receiving elements (photoelectric conversion areas) that are equally divided into two in the vertical direction and two in the horizontal direction. FIG. 9 schematically shows the state in which one pixel of the image sensor of the present embodiment is viewed from the optical system 100 side. The pixel includes one microlens 1100, and four light receiving elements (photoelectric conversion areas) 1101 to 1104. The light receiving elements 1101 to 1104 respectively receive light that has passed through different pupil areas and can acquire, for single shooting, four image signals of an A image, a B image, a C image, and a D image.

When, as shown in FIG. 9, the light receiving elements 1101 to 1104 of the parallax amount detection pixel are arranged in the horizontal and vertical directions, the amount of parallax in the horizontal direction can be obtained between the A and B images or between the C and D images. Furthermore, the amount of parallax in the vertical direction can be obtained between the A and C images or between the B and D images.

The operation of processing performed on image signals of the A image and the B image at the time of shooting of the digital camera 120 according to the present embodiment will be described with reference to the flowchart of FIG. 10A. Note that the processing is assumed to be executed by the digital camera having the configuration shown in FIG. 1, and the operations that are different from those of the first embodiment will mainly be described.

In step S1101, the image signal generating unit 102 receives image signals read out from the image capturing unit 101. The image signals that are received are RAW image signals of the A to D images, which are constituted by a group of signals that are independently read out by the light receiving elements 1101 to 1104 of each pixel of the image capturing unit 101. For example, when the image capturing unit 101 has a Bayer arrangement color filter, all the signals of the A to D images are Bayer arrangement RAW image signals.

In step S1102, the image signal generating unit 102 combines the RAW image signals of the A to D images by summing up the signals read out from the same pixel, and transmits the combined image signal to the image processing unit 105 and the image signal transmitting unit 104. By summing up outputs of the light receiving elements 1101 to 1104 of the same pixel, the summed-up signal serves as a signal of light received by the entire pixel, and can be regarded as an output of an ordinary pixel that has an undivided photoelectric conversion unit. Accordingly, the combined image signal can be used for display or recording as a basic image signal. The image processing unit 105 applies the same developing processing as that of the first embodiment to the received basic image signal. Furthermore, after the special processing for recording or display is applied, the basic image signal is transmitted to the recording unit 106 and the display unit 107.

In step S1103, the parallax amount calculating unit 103 receives the image signals of the A to D images. The image signals of the A to D images may be received directly from the image capturing unit 101 or via the image signal generating unit 102. Then, in step S1104, the parallax amount calculating unit 103 calculates the amount of parallax using the received image signals of the A to D images.

The amount of parallax may be calculated by the same method as that of the first embodiment. The amount of parallax that is calculated may be an amount of parallax in the horizontal direction between the A and B images or between the C and D images, or an amount of parallax in the vertical direction between the A and C images or the B and D images. Alternatively, an amount obtained by summing up the amount of parallax in the horizontal direction and the amount of parallax in the vertical direction may also be used.

In step S1105, the image signal transmitting unit 104 receives the basic image signal generated by the image signal generating unit 102 in step S1102 and the amount of parallax calculated by the parallax amount calculating unit 103 in step S1104. The image signal transmitting unit 104 selects the image signal or the image area that is to be output to the external apparatus 150 (step S1106). Then, the image signal transmitting unit 104 adds information on a parallax amount detection pixel to the selected image signal, and outputs the selected image signal to which the information is added to the external apparatus 150, which may be a personal computer or a cloud computer, or to the recording unit 106 (S1107).

The information on a parallax amount detection pixel refers to information indicating whether or not the image signal is generated by a parallax amount detection pixel, and information indicating which pupil region light that is received by a pixel generating the image signal has passed through. In the case of the present embodiment, information indicating that an image signal is generated from a parallax amount detection pixel and information indicating that an image signal is obtained by summing up image signals generated by the A to D image light receiving elements are added to the basic image signal. Information indicating that an image signal is generated from a parallax amount detection pixel and information indicating that an image signal is generated from the B-image light receiving element are added to the image signal of the B image. The similar information to that of the image signal of the B image is added to the image signals of the C and D images. The present embodiment is described assuming that all the pixels are parallax amount calculation pixels, but when some of the pixels of the image sensor are parallax amount detection pixels, positional information on parallax amount detection pixels may also be added.

The information on a parallax amount detection pixel is used when the amount of parallax is calculated by the external apparatus 150 or the amount of parallax is calculated by the digital camera 120 (parallax amount calculating unit 103) based on recorded data. For example, if it is recognized that the image signals that were recorded or transmitted are a basic image signal obtained by combining the signals of the A to D images and the image signals of the B to D images, it will be possible to generate an image signal of the A image by subtracting the image signals of the B to D images from the basic image signal in later processing. Then, the amount of parallax can be calculated based on the generated image signal of the A image and the received (read-out) image signals of the B to D images. Furthermore, when some of the pixels of the image sensor are parallax amount detection pixels and the positions of the parallax amount detection pixels are recognized, processing for calculating the amount of parallax can be executed only at the positions of the parallax amount detection pixels.

The selection processing performed by the image signal transmitting unit 104 in step S1106 will further be described with reference to FIGS. 10B, 11A, and 11B. The flowchart shown in FIG. 10B shows the operation that is executed for each frame by the image signal transmitting unit 104.

In step S1111, the image signal transmitting unit 104 determines whether or not a change between the amount of parallax calculated in the previous frame and the amount of parallax calculated in the current frame is a threshold or more. The threshold may be defined based on the shooting scene or the F-number at the time of shooting. Furthermore, when a change in the amount of parallax from the previous frame is calculated, a large weight may also be given to the change in the amount of parallax in the center of the screen or an area in which the main subject is present. The image signal transmitting unit 104 advances the procedure to step S1112 if the change in the amount of parallax is a threshold or more, and otherwise, to step S1113.

In step S1112, the image signal transmitting unit 104 decides to transmit the image signals of the B to D images. On the other hand, in step S1113, the image signal transmitting unit 104 decides to transmit the image signal (basic image signal) obtained by combining the A to D images. For example, when a range image is generated by the external apparatus 150 or is generated by the digital camera 120 after shooting, only information needed for calculating the amount of parallax suffices and it is thus not necessary to transmit a frame having the amount of parallax that is not varied (or hardly varied) from the previous frame. Accordingly, the amount of data is reduced in this way by transmitting the image signals of the B to D images, in addition to the basic image signal, only in a frame having a large change in the amount of parallax from the previous frame.

FIG. 11A is a diagram schematically showing an example of image signals that are selected as targets to be transmitted by the image signal transmitting unit 104 in step S1106 and are output in step S1107 in a temporal sequence. Each frame is indicated with the type of the image signal that is to be transmitted and the frame number. For example, if the frames 1, 4, 7, and 10 are determined to have a large change in the amount of parallax from the previous frame, transmission as shown in FIG. 11A will be performed.

Alternatively, as shown in FIG. 11B, the B to D images may also be transmitted in a cyclic manner. The cycle in which the B to D images are transmitted can be determined depending on, for example, the upper limit of the transmission rate when an image signal is transmitted from the image signal transmitting unit 104 to the external apparatus 150. The B image (C image or D image) may also be defined as a target to be transmitted when, instead of the change in the amount of parallax from the previous frame, the change in the amount of parallax from the frame in which the B image (C image or D image) was transmitted last time is a threshold or more. Alternatively, the B image (C image or D image) may also be defined as a target to be transmitted when the amount of parallax in the current frame is a threshold or more.

Accordingly, the same effects as that of the first embodiment can be achieved even when the parallax amount detection pixel includes the four light receiving elements configured to respectively receive light that has passed through different pupil areas.

Third Embodiment

Hereinafter, a third embodiment of the present invention will be described with reference to the drawings.

The present embodiment relates to a method for reducing the amount of data to be transmitted to the external apparatus 150, the method being different from that of the first embodiment. For example, when the digital camera is mounted on a tripod stand and shooting is performed, the area in which the amount of parallax, that is, distance information changes is limited to the area of a moving subject. Accordingly, when the area of the captured image in which distance information changes is limited, the B image of only the area in which distance information changes needs only to be transmitted to an external apparatus.

Figure 12A:
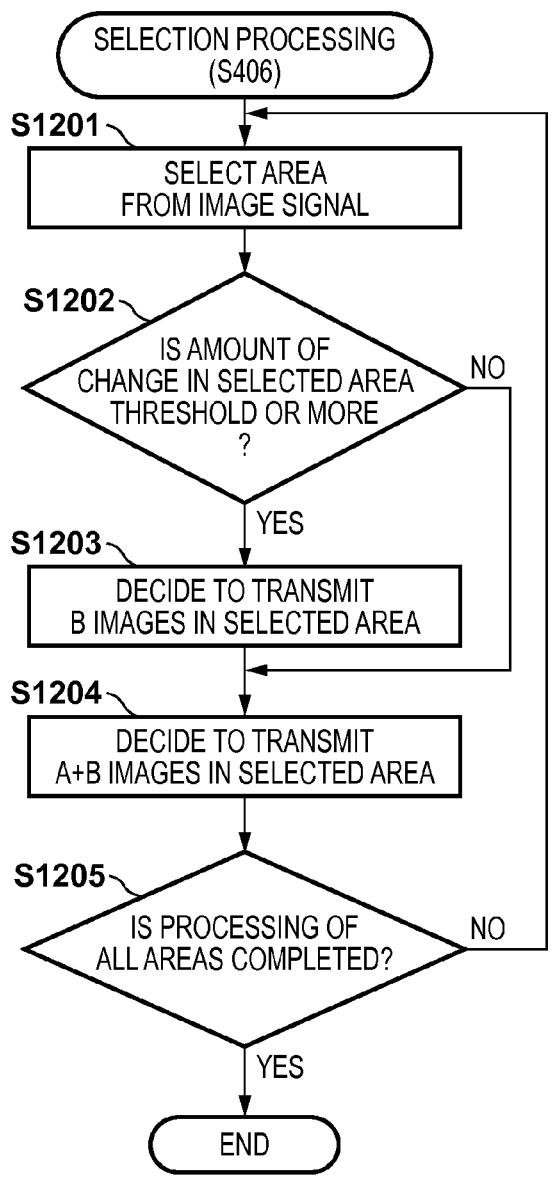
FIGS. 12A and 12B are flowcharts showing the operation of an image signal transmitting unit according to third and fourth embodiments.

The operation (that corresponds to the selection processing performed in step S406) that is performed by the image signal transmitting unit 104 based on this principle will be described with reference to the flowchart of FIG. 12A.

In step S1201, the image signal transmitting unit 104 selects an area from image signals. Here, the area that is selected may be an area (divided area) in the shape of one of blocks obtained by dividing the image signal in the horizontal and vertical directions in one frame, for example. Furthermore, the order of selection is arbitrary as long as all the divided areas are ultimately selected in step S1201, and the selection operation in order from the divided area at the left end to the divided area at the right end can be repeated from top down.

Then, in step S1202, the image signal transmitting unit 104 calculates the amount of change in the image in the selected area. The amount of change may be, for example, a difference from the image in the divided area at the same position in the previous frame in a histogram of the image signal value (luminance value or color difference value) or the magnitude of the motion vector obtained from the frames before and after the current frame. Alternatively, the amount of change may be another characteristic amount depending on the amount of change in the image that is obtained by a more simple method. Furthermore, this amount of change may be calculated by the image signal transmitting unit 104, or characteristic amount calculated by the image processing unit 105 for another purpose, such as a histogram calculated at the time of gradation control or a motion vector for use in encoding a moving image, may be used for this purpose.

Then, the image signal transmitting unit 104 determines whether or not the amount of change in the image in the selected area is a threshold or more, and if the amount of change is the threshold or more, the procedure advances to step S1203, and if the amount of change is less than the threshold, the procedure advances to step S1204. As a result, the image signal transmitting unit 104 decides, as signals that are to be transmitted, the B images and the A+B images in the area in which the amount of change in the image is a threshold or more, and the A+B images in the area in which the amount of change in the image is less than the threshold.

In step S1205, the image signal transmitting unit 104 determines whether or not processing has been completed on all the divided areas in one frame, and if there is a divided area on which the processing has not yet been performed, the procedure from step S1201 is repeated. If the signals that are to be transmitted have been decided for all the divided areas in one frame, the image signal transmitting unit 104 ends the selection processing.

In the first embodiment, the B images in the area in which a difference in the amount of parallax is a threshold or more are transmitted to the external apparatus. However, when the amount of parallax cannot be calculated on the digital camera side, it is possible to determine that the B images in the area in which another characteristic amount indicating the amount of change in the image is a threshold or more are transmitted to the external apparatus, as in the present embodiment.

Note that the amount of parallax may change in an area other than a moving subject area when a shooting parameter such as a diaphragm or a focus distance (angle of view) has changed even if the digital camera is mounted on a tripod stand. Therefore, it is also possible to decide not fail to transmit the B images with respect to the frame in which the shooting parameter has changed. The operation (that corresponds to the selection processing performed in step S406)

that is performed by the image signal transmitting unit 104 based on this principle will be described with reference to the flowchart of FIG. 12B.

In step S1301, the image signal transmitting unit 104 determines whether or not a shooting parameter relating to a change in the amount of parallax has changed from the previous frame. The shooting parameter relating to a change in the amount of parallax refers to, for example, an F-number, a focus distance (angle of view), or the like.

Then, the image signal transmitting unit 104 advances the procedure to step S1302 if the shooting parameter relating to a change in the amount of parallax has changed from the previous frame, and advances the procedure to step S1303 if the shooting parameter relating to a change in the amount of parallax has not changed. As a result, the image signal transmitting unit 104 decides, as a signal that is to be transmitted in the current frame, the B image and the A+B image if the shooting parameter relating to a change in the amount of parallax has changed from the previous frame, and the A+B image if the shooting parameter relating to a change in the amount of parallax has not changed from the previous frame.

Figure 12B:
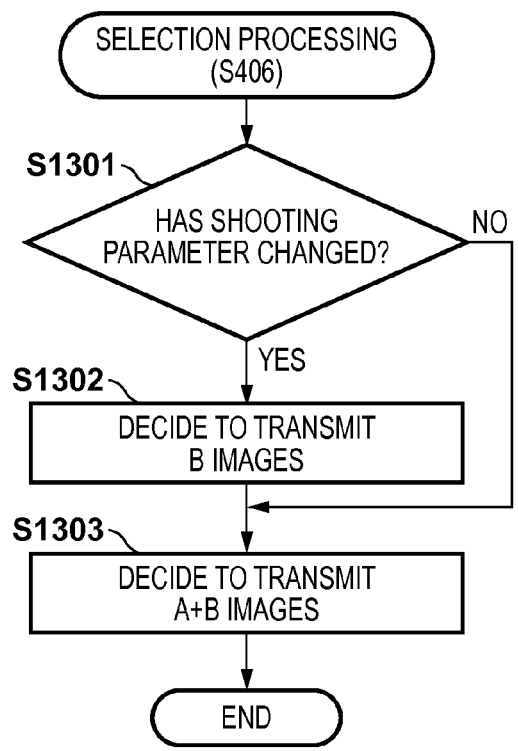

The selection processing of FIG. 12B can be combined with another embodiment. For example, a configuration is possible in which if the determination result is "No" in step S501 in the processing shown in FIG. 3B, the processing of FIG. 12B is executed. Furthermore, a configuration is also possible in which the processing of FIG. 12B is performed before the processing shown in FIG. 12A is performed, and the processing from steps S1201 onward is executed if the determination result is "No" in step S1301.

By adding the processing of FIG. 12B thereto, it is possible to reduce the amount of data to be transmitted and to prevent the state in which later acquisition of distance information is impossible.

According to the present embodiment, by transmitting the B images only in the area in which distance information changes to the external apparatus, the digital camera including the image sensor capable of acquiring parallax images can reduce the amount of data that is to be transmitted or recorded, enabling calculation of the amount of parallax. Therefore, it is possible to realize real-time processing using an external apparatus, or save the capacity of a recording medium.

Furthermore, if the shooting parameter relating to a change in the amount of parallax has changed from the previous frame, the B images in the entire frame are transmitted to the external apparatus, thereby making it possible to reduce the amount of data to be transmitted and to prevent the state in which later acquisition of distance information is impossible.

Fourth Embodiment

Hereinafter, a fourth embodiment of the present invention will be described with reference to the drawings.

The present embodiment relates to a method for reducing the amount of data to be transmitted by compressing (encoding) an image signal (RAW) that is to be transmitted. For example, when an image signal is transmitted to the external apparatus 150, it is conceivable to reduce the amount of data by applying compression processing such as encoding processing to the image signal before transmission. However, when compression processing, such as JPEG-type processing, in which high-frequency components of an image is reduced is applied, the accuracy in the calculation of the amount of parallax in the external apparatus based on the A+B image and the B image may be deteriorated due to the high-frequency component lost in the compression processing. Therefore, in the present embodiment, compression processing is not applied when the A+B image and the B image are to be transmitted but is applied when only the A+B image is transmitted, achieving both the reduction in the amount of data to be transmitted and prevention in deterioration in terms of the accuracy in calculation of the amount of parallax in the external apparatus.

Such processing of the present embodiment will be described with reference to the flowchart of FIG. 13A. First, the image signal transmitting unit 104 determines whether only the A+B image is to be transmitted or both the A+B image and the B image are to be transmitted. The method for determining which image signal is to be transmitted may be any of the methods that have been described so far.

In step S1401, the image signal transmitting unit 104 determines whether the area (the entire or a partial area of one frame) that is a transmission target is an area in which only the A+B image is to be transmitted or an area in which both the A+B image and the B image are to be transmitted. If it is determined that the area is an area in which only the A+B image is to be transmitted, the image signal transmitting unit 104 advances the procedure to step S1402, where the processing for compressing the amount of data is applied to the A+B image, and in step S1403, the compressed A+B image is transmitted to the external apparatus. The compression processing applied in step S1402 is not particularly limited and any method may be used. Furthermore, the image signal transmitting unit 104 may also be provided with a circuit for compression processing.

On the other hand, if it is determined in step S1401 that the area is an area in which both the A+B image and the B image are to be transmitted, the image signal transmitting unit 104 advances the procedure to step S1404, where compression processing is not applied to the A+B image and the B image, and the A+B image and the B image are transmitted to the external apparatus 150 in the state of being uncompressed.

FIG. 13B schematically shows an example of data that is to be transmitted by the processing of FIG. 13A when a signal to be transmitted is determined per unit of frame.

Note that it is also possible to dynamically switch whether or not the processing of FIG. 13A is executed depending on whether or not calculation of the amount of parallax in the external apparatus 150 needs to be performed with accuracy. That is, if there is no need to calculate the amount of parallax with accuracy in the external apparatus 150, compression processing is always applied to all the frames, and if there is the need for calculating the amount of parallax with accuracy in the external apparatus 150, the compression processing needs only to be applied to the frame in which only the A+B image is to be transmitted.

Fifth Embodiment

Hereinafter, a fifth embodiment of the present invention will be described with reference to the drawings.

In contrast to the A+B image of the basic image signal for use in developing processing, the image signal of the B image is mainly used for calculation of the amount of parallax. Therefore, if no accurate calculation of the amount of parallax is needed, it is possible to reduce the amount of data to be transmitted by reducing the image signal of the B image.

When the divided photoelectric conversion units of the image sensor are arranged only in the horizontal direction as shown in FIGS. 2A and 2B, the amount of parallax is calculated based on the shift amount in the horizontal direction in which an A image and a B image have highest correlation, and thus the accuracy in calculation of the amount of parallax is improved with an increase in resolution (increase in the number of pixels) in the horizontal direction.

Therefore, in order to reduce the amount of data of the B image that is to be transmitted while suppressing the accuracy in calculation of the amount of parallax from decreasing, it is only needed to perform reduction (cut-down) mainly in the direction different from the direction in which the shift amount is calculated (here, in the vertical direction, for example). The reduction processing may be performed by the image signal generating unit 102 or the image signal transmitting unit 104.

Figure 14A:
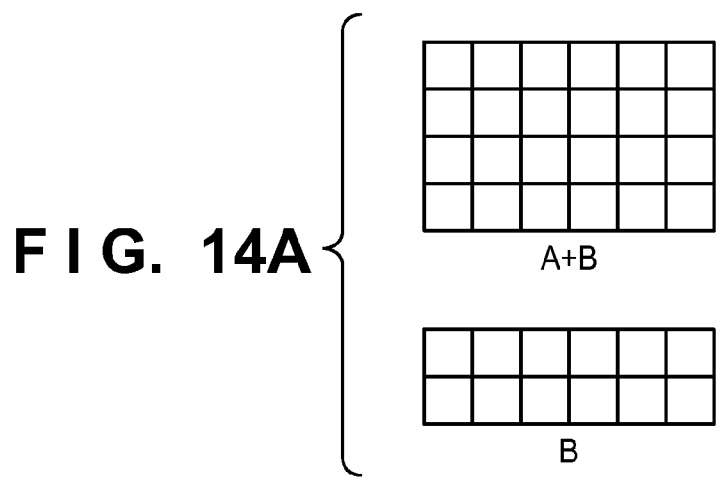
FIGS. 14A to 14C are diagrams illustrating the operation of an image signal transmitting unit according to a fifth embodiment.
Figure 14B:
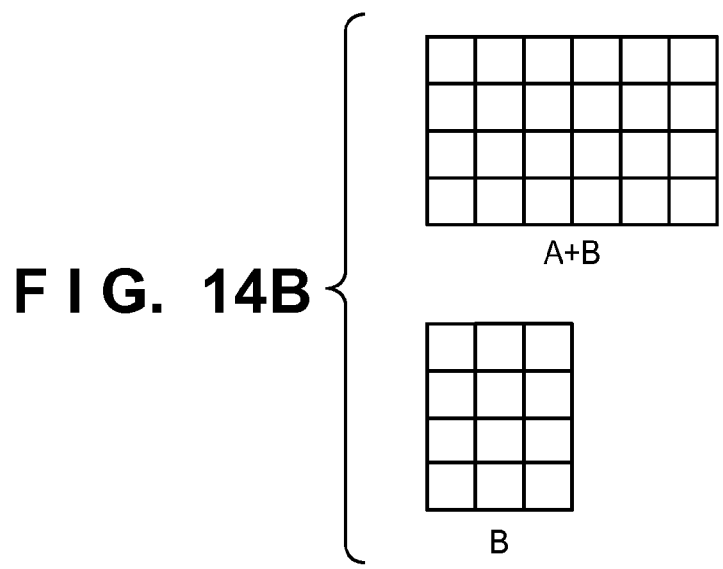
Figure 14C:
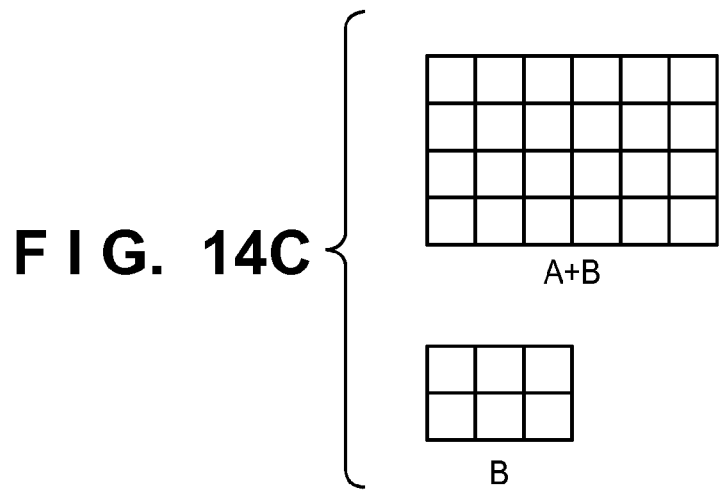

FIGS. 14A to 14C show examples of a method for reduction of the B image. FIG. 14A shows an example in which the resolution of the B image is reduced to a half in the vertical direction (n pixels in the horizontal direction× m/2 pixels in the vertical direction) relative to the resolution of the A+B image (n pixels in the horizontal direction×m pixels in the vertical direction). In this reduction processing, the amount of data of the B image that is to be transmitted can be reduced to the half while maintaining the resolution in the horizontal direction.

FIG. 14B shows an example in which, when the divided photoelectric conversion units are arranged only in the vertical direction, the resolution of the B image is reduced to a half in the horizontal direction (n/2 pixels in the horizontal direction×m pixels in the vertical direction) relative to the resolution of the A+B image (n pixels in the horizontal direction×m pixels in the vertical direction). In this reduction processing, the amount of data of the B image that is to be transmitted can be reduced to the half while maintaining the resolution in the vertical direction.

Accordingly, by reducing an image signal of the B image in the direction different from (for example, orthogonal to) the direction (pupil division direction) in which the divided photoelectric conversion units are arranged, it is possible to reduce the amount of data of the B image that is to be transmitted to an external apparatus while suppressing the accuracy in calculation of the amount of parallax from decreasing.

Note that if there is no need to calculate the amount of parallax with accuracy, the B image may also be reduced, as shown in FIG. 14C, in the direction in which the divided photoelectric conversion units are arranged or may be reduced so that the number of pixels (resolution) in the direction of reduction is less than a half.

Note that the method for reducing an image signal is not particularly limited, and examples of the method include a method in which one pixel value is obtained by summing up a plurality of adjacent image signals, and a method in which image signals are thinned at a predetermined interval. The method in which a plurality of adjacent image signals are summed up is advantageous even for a scene in which a dark subject is shot and the like since the signal amount increases. On the other hand, the resolution may be deteriorated by summing up image signals, and thus if this kind of deterioration is not preferable, it is possible to thin image signals at a predetermined interval.

Sixth Embodiment

Hereinafter, a sixth embodiment of the present invention will be described with reference to the drawings.

Figure 15:
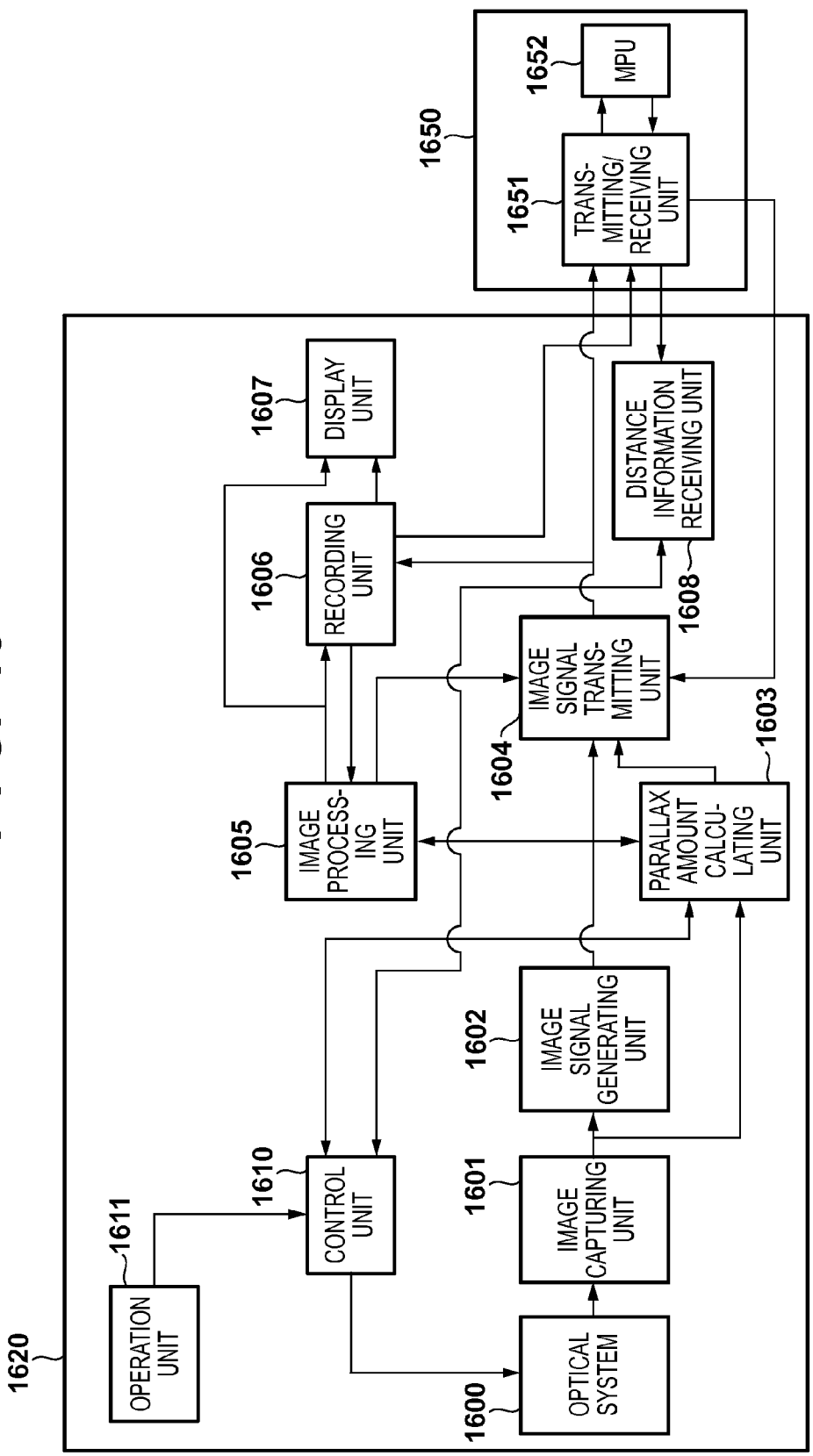
FIG. 15 is a block diagram showing a configuration of an image processing system according to a sixth embodiment.

A digital camera of the present embodiment has the function to transmit image signals of an A+B image and a B image in response to a request from an external apparatus. FIG. 15 is a block diagram showing examples of functional configurations of a digital camera and an external apparatus that constitute an image processing system according to the present embodiment. Functional blocks 1600 to 1652 constituting the image processing system are the same as the functional blocks 100 to 152 of FIG. 1, but in the present embodiment, a signal line from the transmitting/receiving unit 1651 of the external apparatus 1650 to the image signal transmitting unit 1604 of the digital camera 1620 is added. Furthermore, a signal line from the recording unit 1606 of the digital camera 1620 to the transmitting/receiving unit 1651 of the external apparatus 1650 is added. Furthermore, a signal line from the image processing unit 1606 to the image signal transmitting unit 1604 is added.

Figure 16A:
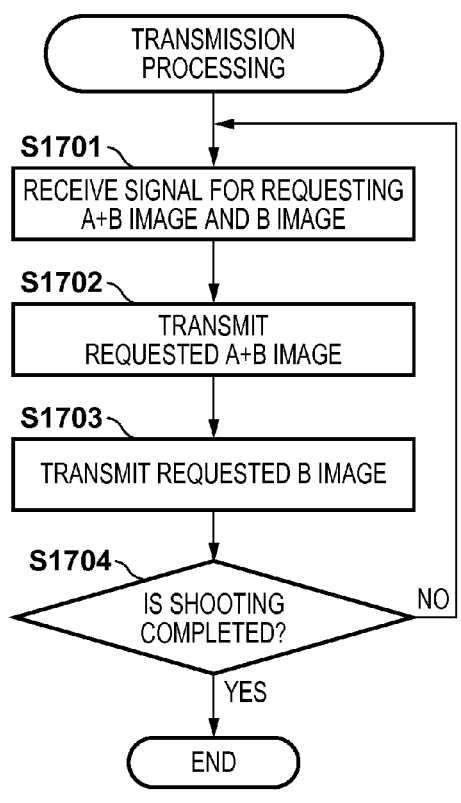
FIGS. 16A and 16B are flowcharts illustrating the operations of an image capture apparatus and an external apparatus of the sixth embodiment.

FIG. 16A is a flowchart illustrating the processing in which the digital camera 1620 transmits an image signal in response to a request from the external apparatus 1650.

First, in step S1701, the image signal transmitting unit 1604 of the digital camera 1620 receives a signal for requesting an A+B image and a B image from the transmitting/receiving unit 1651 of the external apparatus 1650. In the signal for requesting an A+B image and a B image, the transmission rate, information on whether or not data on the B image needs to be reduced, the method for reducing the data, and the like are designated. The request signal generation processing will be described in detail later with reference to FIG. 16B.

Then, in step S1702, the image signal transmitting unit 1604 transmits the requested image signal of the A+B image to the transmitting/receiving unit 1651 of the external apparatus 1650. Then, in step S1703, the image signal transmitting unit 1604 transmits the requested image signal of the B image to the transmitting/receiving unit 1651 of the external apparatus 1650. The image signal transmitting unit 1604 repeatedly executes the above-described steps S1701 to S1703 until it is determined in step S1704 that the shooting is completed.

Figure 16B:
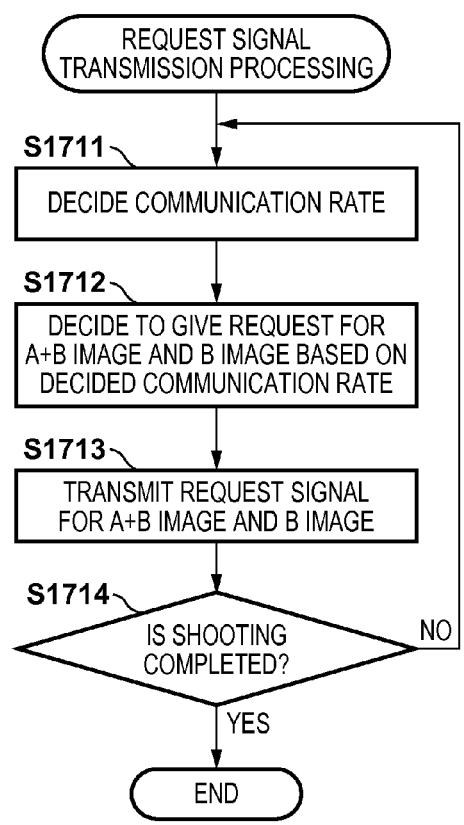

Then, processing for transmitting a signal for requesting the A+B image and the B image from the transmitting/receiving unit 1651 of the external apparatus 1650 will be described with reference to the flowchart of FIG. 16B.

First, in step S1711, the transmitting/receiving unit 1651 of the external apparatus determines the communication rate between the digital camera 1620 and the external apparatus 1650. The communication rate refers to the maximum amount of data that can be transmitted per unit of time between the digital camera 1620 and the external apparatus 1650. For example, the communication rate depends on the communication environment between the digital camera 1620 and the external apparatus 1650, or a communication protocol supported by the digital camera 1620 and the external apparatus 1650. Furthermore, when the external apparatus 1650 is an image processing server on a cloud, the communication rate may depend on the communication congestion situation or the processing power of image processing of the external apparatus 1650.

The transmitting/receiving unit 1651 can determine the communication rate according to a predetermined combination of values relating to a plurality of parameters for use in determining the communication rate. The relationship between a combination of values relating to a plurality of parameters and the associated communication rate is stored in advance in a table format or the like, and communication rate may be determined by referencing the table using the combination of parameter values at the time of determination. The communication rate may, of course, be determined by another method.

Then, in step S1712, the transmitting/receiving unit 1651 determines the request content of the A+B image and the B image based on the communication rate determined in step S1711. For example, it is assumed that, even if the captured A+B image and B image are transmitted from the digital camera 1620 for each frame without reducing the amount of data thereof, the communication rate does not exceed that determined in step S1711. In this case, the transmitting/receiving unit 1651 determines the A+B images and the B images of all the frames and all the areas as the request content, and can transmit the corresponding request signals (step S1713). However, when the communication rate exceeds that determined in step S1711 unless the amount of data is reduced, the transmitting/receiving unit 1651 transmits a request signal for giving an instruction of reducing the amount of data to be transmitted (step S1713).

For example, the external apparatus 1650 acquires capability information from the digital camera 1620 at the time of establishment of communication. This capability information includes information on the shooting frame rate or resolution of a moving image in the digital camera 1620, and information on a data amount reducing method executable by the digital camera 1620 and realizable reduction amount or reduction rate. Alternatively, device type information and capability information of the digital camera are stored in association with each other in the external apparatus 1650, and the capability information may be acquired from the device type information acquired from the digital camera 1620.

Then, the transmitting/receiving unit 1651 compares the communication rate H determined in step S1711 with the maximum data amount M (the amount of data per unit of time when the A+B images and the B images of all the frames and all the areas are transmitted) per unit of time that is obtained from the capability information. Then, if M>H is met, the transmitting/receiving unit 1651 determines, based on the capability information, a method for reducing the amount of data such that M≤H and the necessary accuracy in calculation of the amount of parallax are met.

For example, the transmitting/receiving unit 1651 can instruct, with the request signal, transmission of the A+B image and the B image at a frame rate that is lower than the shooting frame rate. Furthermore, the transmitting/receiving unit 1651 can instruct execution of one or more of the above-described embodiments. The transmitting/receiving unit 1651 executes the procedure from step S1711 to step S1713 repeatedly until shooting of the digital camera 1620 ends.

Note that A+B images and B images or parts of the signals of the image area that were not transmitted to the external apparatus 1650 may be recorded in the recording unit 1606 of the digital camera 1620 and transmitted to the transmitting/receiving unit 1651 of the external apparatus 1650 after the shooting.

Furthermore, in a case where the communication rate is not exceeded even if image signals of the A+B images and the B images of all the frames and image areas are transmitted, the amount of data of the B images that are to be transmitted may be reduced. For example, in the external apparatus, if the amount of parallax (distance information) of only a human face area or another main subject is needed, it is sufficient to transmit a signal for requesting transmission of image signals of B images only in the necessary area to the image capture apparatus.

Similarly, in a case where the communication rate is not exceeded even if image signals of the A+B images and the B images in all the frame and image areas are transmitted, it is possible to request reduction in the resolution of the image signals of the B images depending on the purpose of image processing of the external apparatus (such as an application). If highly accurate distance information is needed, the resolution of the image signal of the B image is not reduced, and if highly accurate distance information is not needed, it is possible to transmit the request signal for requesting a reduction in the resolution of the image signal of the B image, as described in the fourth to fifth embodiments.

Note that the foregoing embodiments are merely examples and various modifications are possible within the scope defined by the claims.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-099828, filed on May 13, 2014, and No. 2015-035630, filed on Feb. 25, 2015, which are hereby incorporated by reference herein in their entirety.

What is claimed is:

1. An image capture apparatus comprising:
an image sensor that is provided with a plurality of pixels each including a plurality of photoelectric conversion units, wherein each of the photoelectric conversion units generates an photoelectric signal, and wherein the image sensor generates:
a first image signal for each pixel based on all of the photoelectric signals generated by the plurality of photoelectric conversion units of each pixel, and
a second image signal for each pixel based on at least one of but not all of the photoelectric signals generated by the plurality of photoelectric conversion units of each pixel;
at least one processor; and
a memory that stores program instructions, which cause, when executed by the at least one processor, the at least one processor to output to an external device, the first image signal according to a first frame frequency and the second image signal according to a second frame frequency being, less than the first frame frequency.

2. The image capture apparatus according to claim 1, wherein the program instructions further cause the at least one processor to generate a moving image or a continuous image by using at least the first image signal.

3. The image capture apparatus according to claim 2, wherein the program instructions further cause the at least one processor to calculate an amount of parallax or an amount of defocus using the first and second image signals.

4. The image capture apparatus according to claim 3, wherein the second image signal is selectively outputted if the amount of parallax is calculated and meets a predetermined condition.

5. The image capture apparatus according to claim 1, wherein the plurality of photoelectric conversion units respectively receive light beams that have passed through different exit pupil regions of an optical system.

6. The image capture apparatus according to claim 1, wherein the second image signal is intermittently outputted at the second frame frequency.

7. The image capture apparatus according to claim 1, wherein the program instructions further cause the at least one processor:
to detect a characteristic feature of a subject based on at least one of the first image signal and the second image signal,
wherein the second image signal is selectively outputted if the characteristic feature meets a predetermined condition.

8. The image capture apparatus according to claim 7, wherein the characteristic feature includes a histogram feature or motion vector feature image signals.

9. The image capture apparatus according to claim 1, wherein the second image signal is selectively outputted if a change in a shooting parameter meets a predetermined condition.

10. The image capture apparatus according to claim 9, wherein the shooting parameter includes an F-number or a focal length of an optical system.

11. The image capture apparatus according to claim 1, wherein the program instructions further cause the at least one processor:
to compress an mount of the image signal,
wherein an amount of data of at least one of the first image signal and the second image signal is compressed.

12. The image capture apparatus according to claim 11, wherein when the first image signal and the second image signal are outputted, the amounts of data of the first image signal and the second image signal are not compressed.

13. The image capture apparatus according to claim 1, wherein the program instructions further cause the at least one processor to reduce a resolution of at least the second image signal.

14. The image capture apparatus according to claim 13, wherein the resolution of the second image signal is reduced in a direction that is different from the direction in which the plurality of photoelectric conversion units of the pixels are arranged.

15. The image capture apparatus according to claim 1, wherein the program instructions further cause the at least one processor to select at least a partial area of the second image signal.

16. The image capture apparatus according to claim 1, wherein the first image signal and the second image signal are outputted to an external apparatus that is capable of communicating with the image capture apparatus, and
the program instructions further cause the at least one processor to:
receive information for controlling the image capture apparatus from the external apparatus; and
control the image capture apparatus based on the received information.

17. A method for controlling an image capture apparatus, the image capture apparatus having an image sensor that is provided with a plurality of pixels each including a plurality of photoelectric conversion units, comprising the steps of:
acquiring photoelectric signals from the plurality of photoelectric conversion units of each pixel;
generating a first image signal for each pixel based on all of the photoelectric signals generated by the plurality of photoelectric conversion units of each pixel;
generating a second image signal for each pixel based on at least one of but not all of the photoelectric signals generated by the plurality of photoelectric conversion units of each pixel; and
outputting, to an external device, the first image signal according to a first frame frequency, and the second image signal according to a second frame frequency being less than the first frame frequency.

18. A non-transitory computer-readable storage medium that stores instructions, which causes, when executed by at least one processor, to perform a control method for controlling an image capture apparatus, the image capture apparatus having an image sensor that is provided with a plurality of pixels each including a plurality of photoelectric conversion units, comprising the steps of:
acquiring photoelectric signals from the photoelectric conversion units of each pixel;
generating a first image signal for each pixel based on all of the photoelectric signals generated by the plurality of photoelectric conversion units of each pixel;
generating a second image signal for each pixel based on at least one of but not all of the photoelectric signals generated by the plurality of photo electric conversion units of each pixel; and
outputting, to an external device, the first image signal according to a first frame frequency and the second image signal according to a second frame frequency being less than the first frame frequency.

* * * * *